(12) United States Patent
Dulberg et al.

(10) Patent No.: US 12,474,125 B2
(45) Date of Patent: Nov. 18, 2025

(54) PLATE HEAT EXCHANGER WITH OVERLAPPING FINS AND TUBES HEAT EXCHANGER

(71) Applicant: WATERGEN LTD., Petach Tikva (IL)

(72) Inventors: Sharon Dulberg, Beer Sheva (IL); Arye Kohavi, Newe Monosson (IL)

(73) Assignee: WATERGEN LTD., Petach Tikva (IL)

( * ) Notice: Subject to any disclaimer, the term of this patent is extended or adjusted under 35 U.S.C. 154(b) by 1 day.

(21) Appl. No.: 18/107,104

(22) Filed: Feb. 8, 2023

(65) Prior Publication Data

US 2023/0184493 A1 Jun. 15, 2023

Related U.S. Application Data

(63) Continuation of application No. 15/822,426, filed on Nov. 27, 2017, now Pat. No. 11,592,238.

(30) Foreign Application Priority Data

Nov. 23, 2017 (IL) .......................................... 255877

(51) Int. Cl.
*F28D 9/00* (2006.01)
*B01D 53/26* (2006.01)
(Continued)

(52) U.S. Cl.
CPC ......... *F28D 9/0093* (2013.01); *B01D 53/265* (2013.01); *B21D 53/04* (2013.01);
(Continued)

(58) Field of Classification Search
CPC .... F28D 9/0093; F28D 9/0031; F28D 9/0037; F28D 9/005; F28D 9/0068; F28D 9/02;
(Continued)

(56) References Cited

U.S. PATENT DOCUMENTS 3,840,070 A   10/1974   Becker et al.
3,899,023 A   8/1975    Zander et al.
(Continued)

FOREIGN PATENT DOCUMENTS

CA   1119159 A    3/1982
CN   1354829 A    6/2002
(Continued)

OTHER PUBLICATIONS

International Search Report of Application No. PCT/IL2018/051266 mailed on Mar. 7, 2019.
(Continued)

*Primary Examiner* — Travis Ruby
(74) *Attorney, Agent, or Firm* — PEARL COHEN ZEDEK LATZER BARATZ LLP

(57) ABSTRACT

A heat exchanger comprises a stack of sets of fins and tubes attached to or encompassed by embossed plates comprising a void. In some embodiments, the fins overlap the void having a peripheral margin of the fin attached to the peripheral margin around the void. In some embodiments, the fins comprise through fluid apertures allowing lateral fluid flow. In some embodiments, the plates comprise lateral peripheral protrusions enabling selective sealing of gaps between adjacent stacked plates by unselective application of heat or adhesive to a face of the heat exchanger. In some embodiments, the plates comprise uniformizing protrusions in a fluid inlet and/or outlet zone that reduce the amount of non-uniform fluid mass flow between different channel protrusions of heat exchanging zones of the set. Also disclosed are methods for assembly and selective sealing of the heat exchanger and an apparatus comprising the same.

15 Claims, 14 Drawing Sheets

(51) Int. Cl.
*B21D 53/04* (2006.01)
*B23P 15/26* (2006.01)
*E03B 3/28* (2006.01)
*F28D 1/04* (2006.01)
*F28F 1/32* (2006.01)
*F28F 3/08* (2006.01)
*F28D 21/00* (2006.01)

(52) U.S. Cl.
CPC .............. *B23P 15/26* (2013.01); *E03B 3/28* (2013.01); *F28D 1/0461* (2013.01); *F28F 1/325* (2013.01); *F28F 3/08* (2013.01); *F28F 3/086* (2013.01); *F28D 2021/0038* (2013.01); *F28D 2021/0071* (2013.01)

(58) Field of Classification Search
CPC .......... F28D 1/0461; F28D 2021/0038; F28D 2021/0071; F28D 7/0066; F28D 7/0075; F28F 1/325; F28F 1/128; F28F 3/08; F28F 3/086; F28F 3/005; F28F 3/027; F28F 3/044; F28F 3/10; F28F 2215/08; F28F 2215/02; F28F 2230/00; F28F 2275/025; F28F 2235/00; F28F 2280/00
See application file for complete search history.

(56) References Cited

U.S. PATENT DOCUMENTS

| | | |
|---|---|---|
| 3,916,644 A | 11/1975 | Nasser |
| 4,327,802 A | 5/1982 | Beldam |
| 4,353,415 A | 10/1982 | Klaschka et al. |
| 4,475,589 A | 10/1984 | Mizuno |
| 4,615,384 A | 10/1986 | Shimada et al. |
| 5,697,432 A | 12/1997 | Yun et al. |
| 5,727,623 A | 3/1998 | Yoshioka et al. |
| 5,738,168 A | 4/1998 | Patel et al. |
| 6,047,769 A | 4/2000 | Shimoya et al. |
| 6,282,915 B1 | 9/2001 | Egbert |
| 6,378,604 B1 | 4/2002 | Feind et al. |
| 6,644,389 B1 | 11/2003 | Kang et al. |
| 6,889,758 B2 | 5/2005 | Burgers et al. |
| 7,174,954 B1 | 2/2007 | Schwartz et al. |
| 7,290,595 B2 | 11/2007 | Arai |
| 8,590,606 B2 | 11/2013 | Arai |
| 2002/0144810 A1 | 10/2002 | Klingler et al. |
| 2002/0195239 A1 | 12/2002 | Duerr et al. |
| 2004/0250557 A1 | 12/2004 | Yabu et al. |
| 2006/0266507 A1 | 11/2006 | Eom et al. |
| 2008/0006039 A1 | 1/2008 | Kim |
| 2009/0126913 A1 | 5/2009 | Lee et al. |
| 2013/0167584 A1 | 7/2013 | Swaminathan |
| 2013/0264038 A1 | 10/2013 | Kerler et al. |
| 2014/0069137 A1 | 3/2014 | Wu |
| 2014/0261764 A1 | 9/2014 | Kohavi |
| 2015/0068244 A1 | 3/2015 | Lee et al. |
| 2017/0082379 A1 | 3/2017 | Agostini et al. |

FOREIGN PATENT DOCUMENTS

| | | |
|---|---|---|
| CN | 1536321 A | 10/2004 |
| CN | 2672599 Y | 1/2005 |
| CN | 202885629 U | 4/2013 |
| CN | 203758092 U | 8/2014 |
| EP | 2369284 | 9/2011 |
| ES | 1020342 U | 6/1992 |
| GB | 861941 | 3/1961 |
| GB | 938088 A | 9/1963 |
| GB | 2160634 | 12/1985 |
| JP | S61110889 A | 5/1986 |
| JP | H08145582 A | 6/1996 |
| JP | 2011-220546 A | 11/2011 |
| KR | 20020004529 A | 1/2002 |
| KR | 20020042326 | 6/2002 |
| KR | 20030042326 | 5/2003 |
| WO | WO 1996/026408 | 8/1996 |
| WO | WO 2001/069154 | 9/2001 |
| WO | WO 2003/001861 | 1/2003 |
| WO | WO 2003/039786 | 5/2003 |
| WO | WO 2004/040219 | 5/2004 |
| WO | WO 2005/071342 | 8/2005 |
| WO | WO 2007/071796 | 6/2007 |
| WO | WO 2007/089134 | 8/2007 |
| WO | WO 2008/055981 | 5/2008 |
| WO | WO 2014/141059 | 9/2014 |

OTHER PUBLICATIONS

Office Action for Chinese Patent Application No. 2018800849217, mailed Jul. 2, 2021.

Search Report of Israel Application No. 255877 mailed on Apr. 25, 2018.

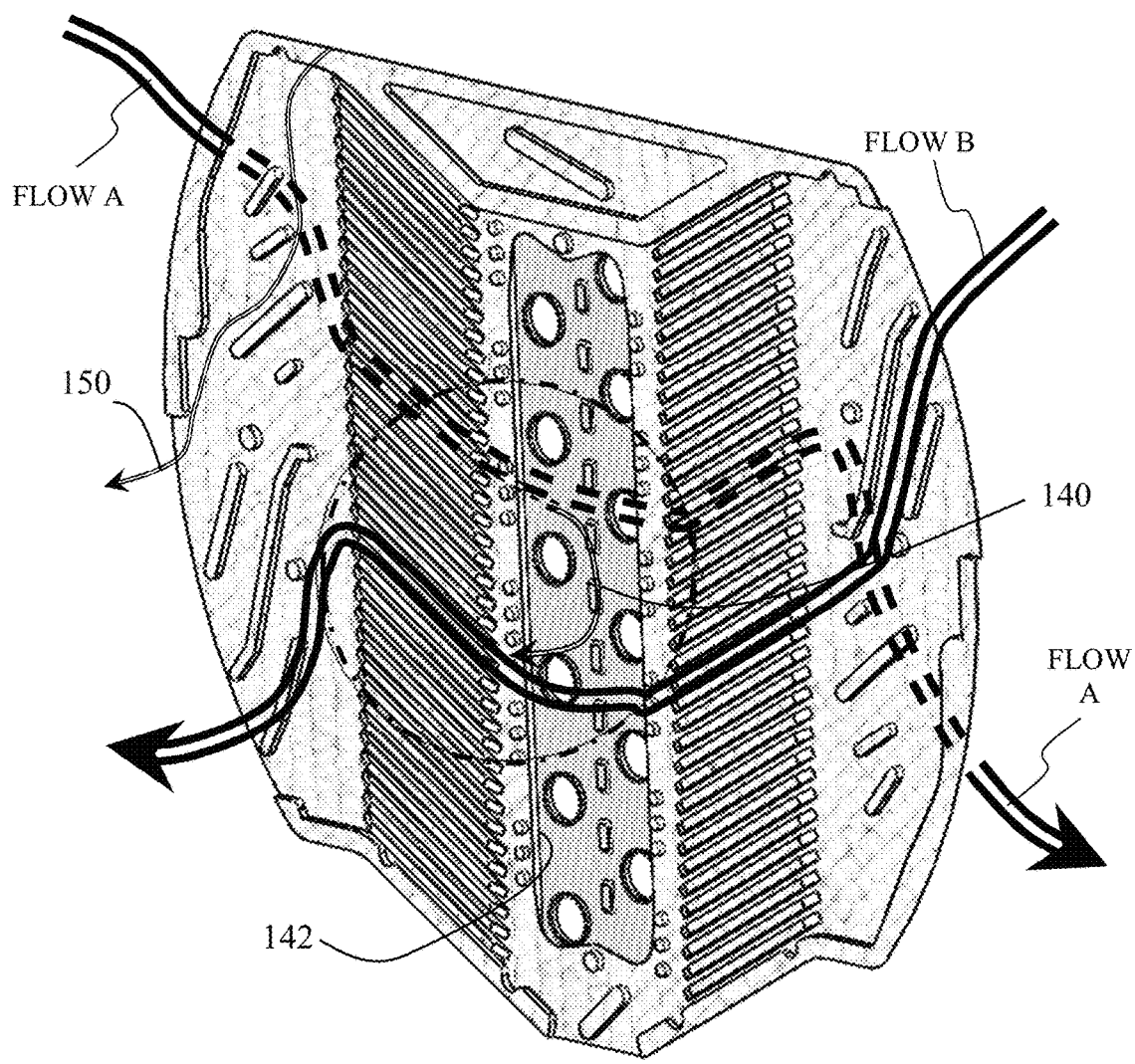
Fig. 1E
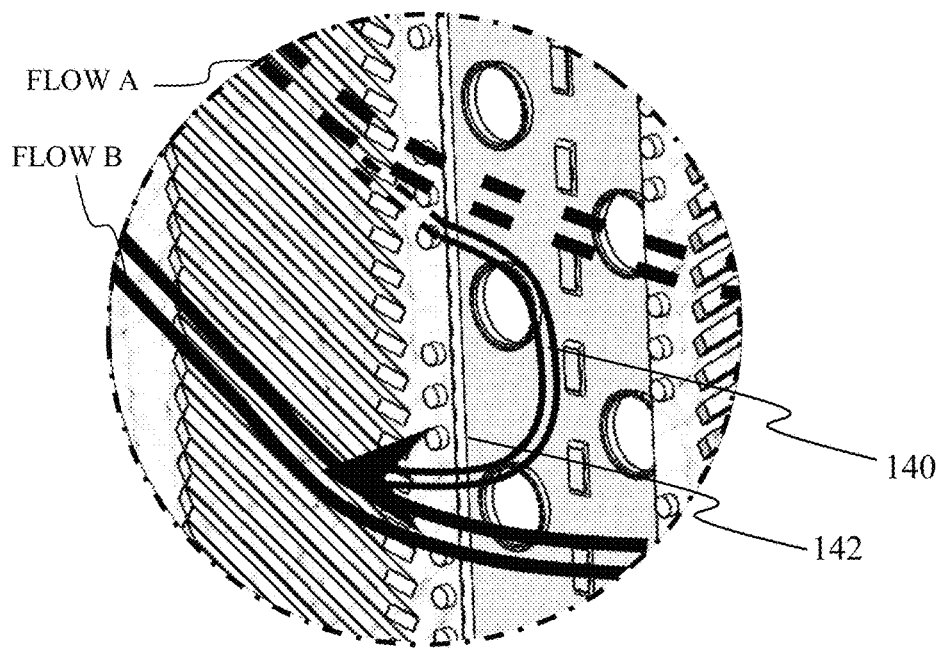

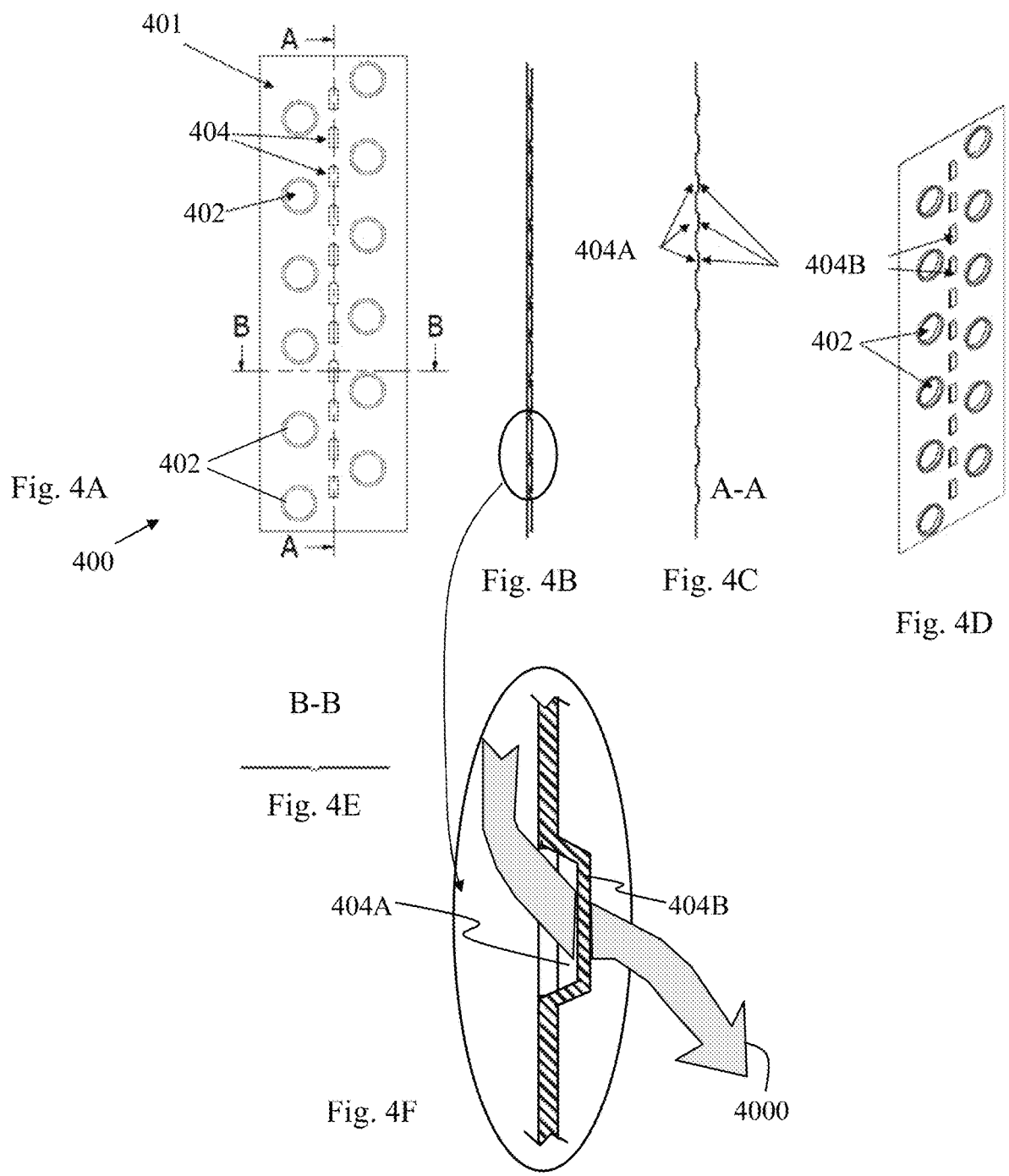

PLATE HEAT EXCHANGER WITH OVERLAPPING FINS AND TUBES HEAT EXCHANGER

CROSS REFERENCE TO RELATED APPLICATIONS

This application is a continuation of U.S. patent application Ser. No. 15/822,426, filed Nov. 27, 2017, which claims the benefit of Israeli Patent Application No. 255877, filed on Nov. 23, 2017, both of which are incorporated herein by reference.

TECHNICAL FIELD

The present invention relates to the field of heat exchangers. More particularly, the invention relates to a heat exchanger apparatus and manufacture thereof.

BACKGROUND OF THE INVENTION

Extraction of liquid from gas, such as extraction of water from air, is well known and typically involves enforcement of condensation conditions of gas containing liquid vapor by lowering its temperature below the dew point temperature, thereby causing vapor to condensate and liquid is thereby released from the carrying gas. While this method is highly available, one major obstacle for using it is the high amount of heat energy needed to be evacuated, in form of both latent heat of the vapor and byproduct of cooling large amount of carrying gas. The high energy cost and the high cost of available systems often render this solution uneconomic. The energy cost for a given amount of extracted water is an important factor in deciding to choose this solution among others. This description of embodiments of the invention depicts a heat exchanger and a method, each enable reduction in the energy consumption and enable to reduce both operational and production costs of extraction machines from this type of solution.

Another implementation of the present invention enables to reduce energy cost in processes when heating is required, and cooling back is possible or required.

SUMMARY OF THE INVENTION

The invention relates to a heat exchanger comprising a fins and tubes heat exchanger and a plates heat exchanger. The fins and tubes heat exchanger comprises a stack of fins, the fins comprising at least one through hole coupled with a penetrating heat exchanging tube. The plates heat exchanger comprises a stack of plates, at least two sets of flow inlets and two sets of flow outlets, at least a portion of the plates each comprising a void and an embossment. Each one of at least a portion of the fins of the fins and tubes heat exchanger is at least partially attached to or encompassed by a corresponding plate of the plates heat exchanger to define a set of a fin and a plate (SFP) and wherein at least one of: (i) an alternating order of differently plates; and (ii) an alternating orientation of plates in the stack, is adapted to enable one or more of (i) a simultaneous counter fluid flow, (ii) cross fluid flow or (iii) semi counter-cross fluid flow above and below the SFP. The assembly of a stack of SFPs with tubes (e.g., heat exchange fluid tubes) defines a heat exchanger of fins and tubes assembled to plates (HEFTAP).

In a first aspect, the invention discloses a HEFTAP comprising fins which at least partially overlap the void of the corresponding plate, and at least a portion of a peripheral margin of the fin is attached to at least a portion of a peripheral margin around the void of the plate such that fluid flowing over either side of the plate comes in contact with the fin.

In a second aspect the invention discloses a HEFTAP wherein at least a portion of the fins comprising at least one through fluid aperture allowing fluid to pass from one side of the fin to the other side.

In a third aspect, the invention provides a HEFTAP wherein the plates comprise lateral peripheral protrusions designed to form, when the plate is stacked with another plate, at peripheral locations intended to be sealed, at least one of:
 (i) a gap between the peripheral protrusions and a surface of an adjacent plate facing the peripheral protrusion, being sufficiently narrow to enable applied adhesive to fill the gap; and
 (ii) an outer lateral width of the two plates, enabling an applied adhesive to encircle the outer edges of the plates;
wherein the plate is designed to form a gap, when the plate is stacked with another plate, between the edge of the plate and the edge of the adjacent plate facing the first plate at locations where the gap should remain open, being larger than a gap allowing an applied adhesive to fill or encircle the gap such that the gap remains open.

In a fourth aspect, the invention provides a HEFTAP wherein the plates comprise lateral peripheral protrusions designed to form, when the plate is stacked with another plate, at peripheral locations intended to be sealed, a gap between the peripheral protrusions and a surface of an adjacent plate facing the peripheral protrusion, being sufficiently narrow to enable the edges of the plates to melt and coalesce upon applying heat; and
 wherein the plate is designed to form a gap, when the plate is stacked with another plate, between the edge of the plate and the edge of the adjacent plate facing the first plate at locations where the gap should remain open, being larger than a gap allowing the edges of the plates to melt and coalesce upon applying heat such that the gap remains open.

In a further aspect, the invention provides a HEFTAP comprising plates comprising a fluid inlet zone, a first heat exchanging zone comprising channel protrusions, a second heat exchanging zone, a third heat exchanging zone comprising channel protrusions and a fluid outlet zone, at least one of the fluid inlet zone and the fluid outlet zone comprising uniformizing protrusions configured to reduce the amount of non-uniform fluid mass flow between different channel protrusions in at least one of the first heat exchanging zone and the third heat exchanging zone and through the second heat exchanging zone.

In a further aspect, the invention discloses a plate of a heat exchanger as defined in any one of the definitions above.

In a further aspect, the invention discloses a method for selectively sealing gaps between adjacent plates of a plates heat exchanger comprising the steps:
 obtaining a plates heat exchanger comprising at least one face comprising peripheral edges of plates as defined in the third or fourth aspect;
 applying adhesive or heat, according to the type of plate of the plate obtained, to at least one of the faces of the plates heat exchanger comprising peripheral locations intended to be selectively sealed;
 to obtain a selectively sealed plates heat exchanger at least at one face.

In a further aspect, the invention provides a method for manufacturing a heat exchanger comprising the steps of:

(a) obtaining plates of a heat exchanger as defined in one of the aspects as defined above and fins as defined the first aspect;
(b) optionally placing an end plate comprising through holes for penetrating heat exchange fluid tubes and optionally inserting at least two longitudinal heat exchange fluid tubes or guiding rods through two of said through holes;
(c) laying the obtained fin on top of an assembling surface or on the end plate when applicable while inserting the guiding tubes or rods through the through holes when applicable or having through holes of the fin aligned with through holes of the end plate;
(d) laying the obtained plate on the fin having the face of the plate which should be in contact with the fin facing the fin having the void of the plate overlapping a portion of the fin comprising at least one through hole for heat exchange tubes and, when applicable, encompassing the tubes or rods erected from the assembling surface;
(e) laying another obtained fin over the plate laid in step (d) having the face of the fin which is supposed to face the next plate facing away from the previously laid plate and having through holes of the fin are aligned with through holes of the previous fin, so that the through hole is being stringed by the guiding tubes or rods through the through, when applicable;
(f) repeating steps (d) and (e) until a stack of plates coupled to fins of a desired length is obtained;
(g) optionally capping the stack with an end plate;
(h) inserting remaining longitudinal heat exchange fluid tube(s) through the through holes of the fins if applicable; and
(i) optionally blowing the heat exchanging tube(s) to improve heat transfer between a tube and fin-through hole—to obtain a heat exchanger of plates and fins and tubes assembly.

In a further aspect, the invention provides an apparatus comprising a compressor, a condenser, an expansion valve and an evaporator enabling a refrigerating process wherein the condenser is a fins and tubes heat exchanger of a heat exchanger as defined above, the evaporator is positioned downstream the heat exchanger such that airflow which exits the heat exchanger flows through the evaporator. Alternatively, the evaporator is the aforementioned fins and tubes heat exchanger, the condenser is positioned downstream the heat exchanger and airflow which exits the heat exchanger flows through the condenser.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1E is an isometric schematic illustration of a SFP of a heat exchanger according to the prior art including illustration of fluid leakages during operation of the heat exchanger.

FIGS. 4A-4F are front view of a fin (FIG. 4A), side view of the fin (FIG. 4B), cross section of the fin along line A-A in FIG. 4A (FIG. 4C), isometric view of the fin (FIG. 4D), cross section of the fin (FIG. 4E) along line B-B in FIG. 4A and an enlarged partial view the cross-section A-A, according to some embodiments of the present invention (FIG. 4F).

Figure 1A:
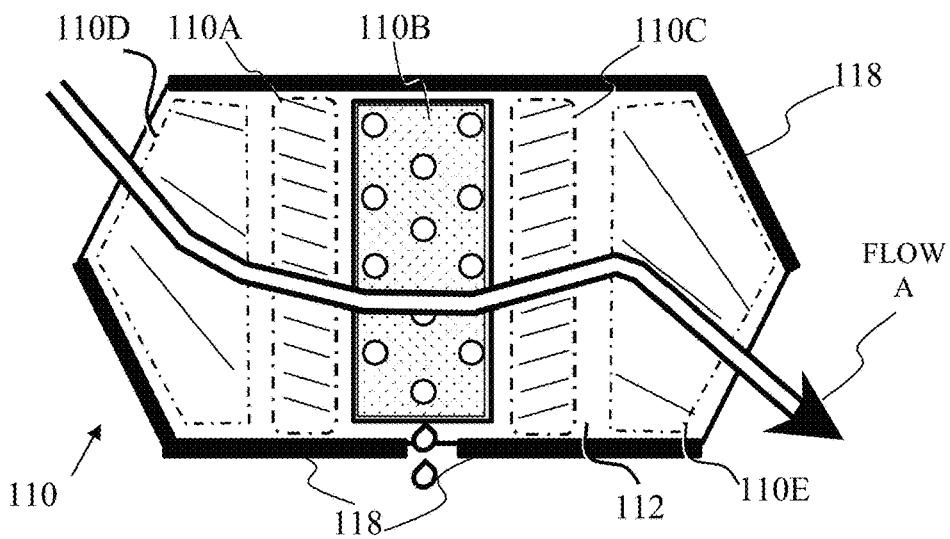
FIG. 1A-1B are front schematic illustrations of two types of a plate and a fin defining a set of fin and plate (SFP) of a heat exchanger according to the prior art.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The present invention enables the reduction of heat consumption and may be implemented in various types of processes where cooling a fluid is required, followed by reheating at least some of it (i.e., distillation of ethanol from water-ethanol vapor mixture, solvent vapor extraction for air, humidity extraction from air, etc.). Another application of present invention relates to processes when heating the fluid is required and cooling it afterward is possible (i.e., milk pasteurization/UHT process, air sterilization by heat, ozone disassembling by heat, etc.)

For sake of simplicity, the description mostly refers to a dehumidifier or water-from-air extraction apparatus having a heat exchanger comprising heat exchanging fluid tubes which contain a cold refrigerant, and to air as the subject fluid being treated, including air conditioners, air-dryers, dehumidifiers, water-from-air apparatuses etc.

However, one who is skilled in the art can adapt the apparatus and the method to other usages under the scope of current invention, some mentioned herein, for example: when the tubes contain a cold heat exchanging fluid; when the tubes contain hot heat exchanging fluid; when the subject fluid is different from air etc. The terms "air" and "fluid" as well as "air flow" and "fluid flow" are thus interchangeably used throughout the specification.

The inventors of the present invention have previously disclosed in U.S. Patent Application Publication No. 2014/0261764 a water extracting apparatus, comprising a heat exchanger assembly, designed to allow efficient heat exchange between pre-cooled inlet air and post heated outlet air so that the pre-cooled inlet flow arrives to the second heat exchanger at a lower temperature where it exchanges heat with the coolant. The high heat exchange efficiency is achieved, among other features, due to the structure of the heat exchanger comprising two types of planar heat exchange elements (i.e., plates of a plates heat exchanger), comprising a void (e.g., a cutout defined by internal edges of the plates) and differing only by having two different embossment topographies, which are alternately arranged in a stack. As the cutouts are all aligned with each other, the stack of heat exchange plates defines a plates heat exchanger having a void in its center. The void in the stack of plates heat exchanger encompasses a stack of fins comprising through holes coupled to heat exchange tubes, which defines a fins and tubes heat exchanger serving as a cooled (or heated) core of the assembly, along which an air flow may pass. Fins of the fins and tubes heat exchanger are coupled to plates of the surrounding plates heat exchanger such that each fin coupled to a plate forms a set of a fin and a plate (SFP). The assembly of a stack of SFPs with tubes (e.g., heat exchange fluid tubes) defines a heat exchanger of fins and tubes assembled to plates (HEFTAP). The HEFTAP may also be viewed as an assembly of a fins and tubes heat exchanger encompassed by plates heat exchanger, such that the fins and tubes heat exchanger is at the core of the assembly. During the operation of the water extraction apparatus the assembly of the plates heat exchanger surrounding the core fins and tubes heat exchanger produces interleaved, in some embodiments, counter-flows of air over each other, while flowing through the fins of the core in mutually alternant directions.

Figure 1B:
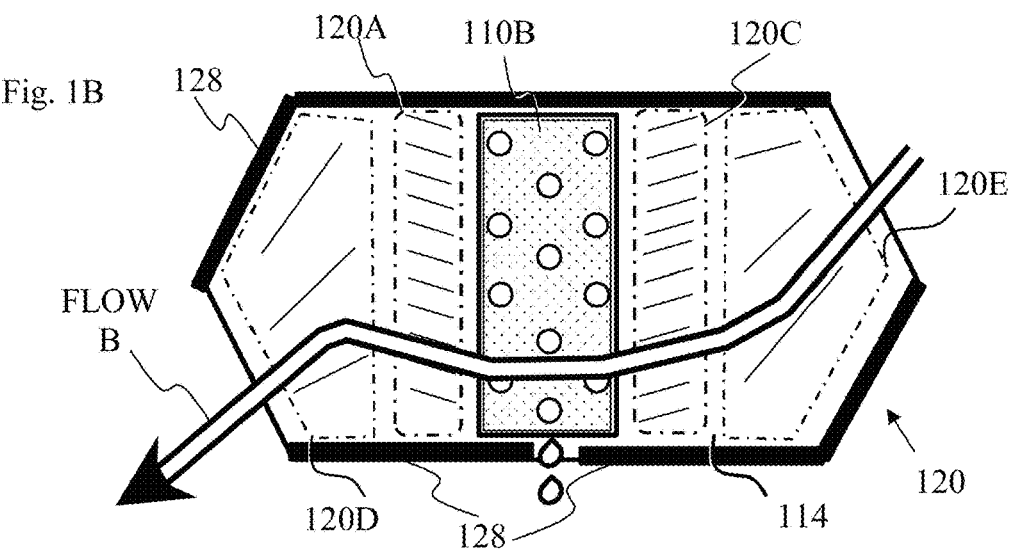
Figure 1C:
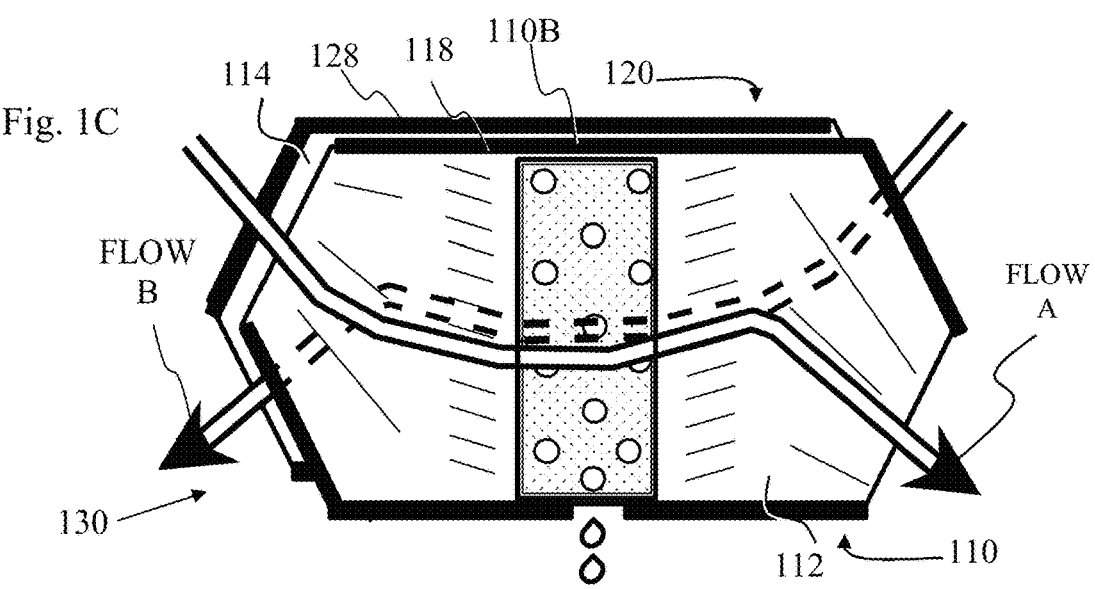
FIG. 1C is a front schematic illustration of a pair of the two types of SFPs of a heat exchanger according to the prior art.
Figure 1D:
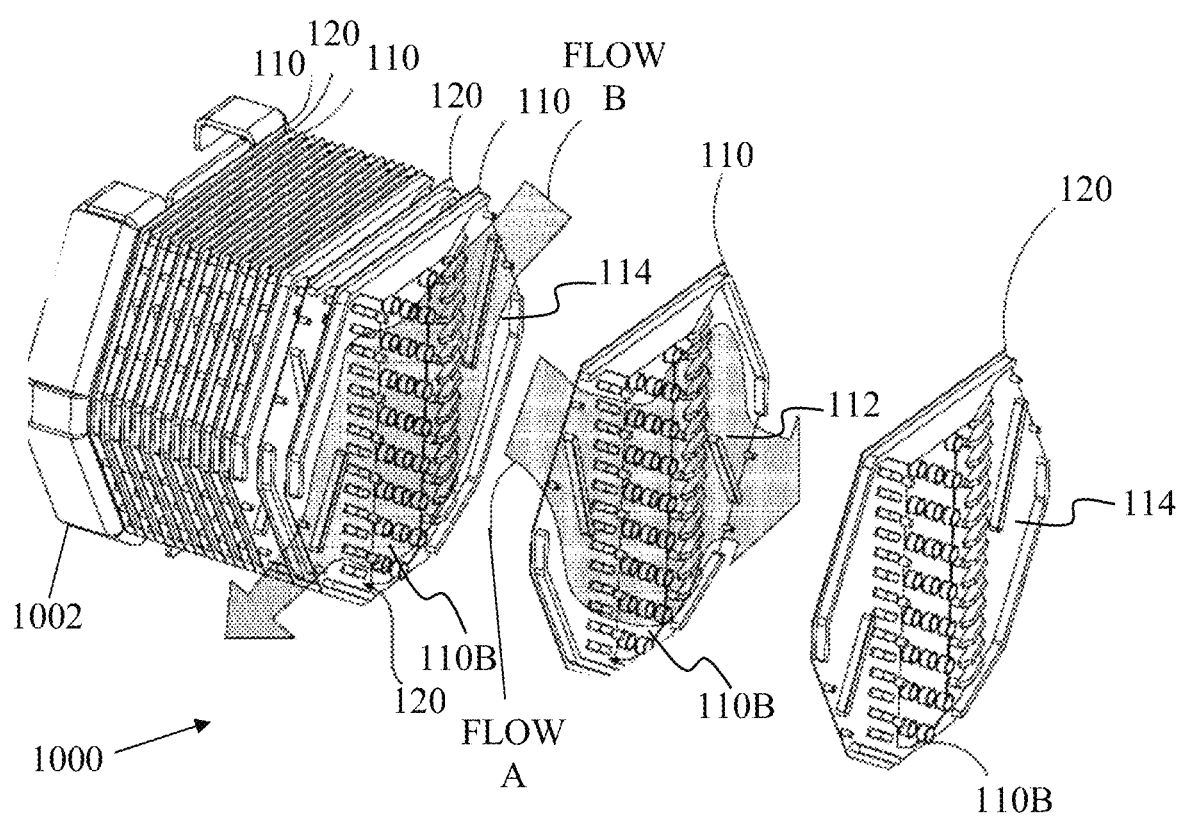
FIG. 1D is an isometric and partially blown view of a heat exchanger, according to the prior art.

Reference is made to FIG. 1A, which is a schematic illustration of a first SFP 110 that includes plate 112 and fin 110B, and FIG. 1B, which is a schematic illustration of a second SFP 120 that includes plate 114 and another fin 110B. FIGS. 1C and 1D are isometric and partially blown drawing of a pair 130 of SPF and HEFTAP 1000, respectively, wherein the HEFTAP is built from multiple SFPs 110 and 120, and operative according to embodiment of prior art. Each SFP of the HEFTAP is a coupled pair of a plate (112 and 114, respectively) and a pair of fins 110B. Both plates 112 and 114 have a void in the form of a cutout accommodating the fin 110B being coupled to that plate. In the embodiment depicted in FIGS. 1C and 1D, the two types of plates 112 and 114 are identical except for their embossments being mirror image of each other. The embossment is configured to channel the fluid flow in a designed pathway. The mirror image embossment of plates 112 and 114 and the alternating arrangement of the SFPs 110 and 120 dictates that a fluid such as air flowing into the HEFTAP 1000 is split into two main flows, flow A and flows B. Each flow A flows between two SFPs in front of the face of an essentially planar SFP 110 and behind the back face of essentially planar SFP 120. Each flow B flows between two SFPs in front of the face of an essentially planar SFP 120 and behind the back face of next essentially planar SFP 110. Flow A enters the area of SFP 110, between two plates 112 and 114 (plate 114 which enclaves flow A is shown only in FIG. 1D), via fluid inlet zone 110D, then channeled over a first heat exchanging zone 110A, then between two fins 110B, through a second heat exchanging zone corresponding to fin 110B, then between two plates 112 through third heat exchanging zone 110C and then through air outlet zone 110E. Similarly, and in counter direction, air flow B enters the area of SFP 120 between two plates 112 and 114 via air inlet zone 120E, then channeled over first heat exchanging zone 120C, then between two fins through a second heat exchanging zone corresponding to fin 110B, then between two plates through third heat exchanging zone 120A and then through air outlet zone 120D.

It is noted that the zones in FIG. 1A-1B are depicted as being separated from one another for sake of simplicity, in order to indicate the areas which are distinctly separated. However, it should be appreciated that the spaces between the zones are part of the overlapping boundaries of two adjacent zones.

FIG. 1C depicts an isometric view of the combined SFPs 110 and 120, of FIGS. 1A and 1B placed one in front of the other to emphasize the resulting combined flows. The directed pathway of flows A and B is achieved, inter alia, due to the flow blockage protrusions 118 and 128 on the periphery of the essentially planar SFPs 110 and 120, respectively. As is clearly seen, airflows A and B flow over each other in cross flow scheme a counter flow scheme or a semi counter-cross scheme (the term "semi counter-cross flow" means that the relative direction of two fluid flows is in between being perpendicular to being counter) in three heat exchanging zone pairs: (i) 110C and 120C, (ii) the two fins 110B of 110 and 120 and (iii) 110A and 120A. Those three zone pairs together with the inlets (110D, 120E) and outlets zones (110E, 120D) renders the heat exchange, while heat can be transferred through the plates and fins.

The passage of airflow A in front of its respective essentially planar SFP 110, the passage of airflow B in front its respective essentially planar SFP 120, and the way airflows A and B interact with each other are seen clearly in FIG. 1D. By way of example, a fluid flow A flowing from the fluid inlet zone 110D toward the second heat exchanging zone 110B exchanges heat in the first heat exchanging zone 110A with a counter, cross fluid flow or semi-cross counter fluid flow B flowing simultaneously on the other side of the plate 110 through the plate's surface, then the fluid flow exchanges heat with the exposed fins in the second heat exchanging zone 110B, then exchanges heat with a counter fluid flow, cross fluid flow or semi-cross counter fluid flow B on the other side of the plate 110 through the plate's surface in the third heat exchanging zone 110C and exits through the fluid outlet zone 110E.

Heat exchanger end plate 1002 is also depicted (see below). The term "end plate" relates to a mechanical element of the HEFTAP positioned at an end of the stack of SFPs, enabling the adaption and/or fixation of the HEFTAP to its place.

One implementation of an improved heat exchanging unit for energy-wise efficiently, while forcing external originating heat exchanging fluid through the tubes of the fin and tubes heat exchanger, is to absorb heat from entering fluid (flows A and B), e.g., humid air, both upstream and on the second heat exchanger zone 110B and heating it back downstream the second heat exchanger zone 110B. That results improving in the energetic efficiency of water extraction process.

Second implementation of an improved heat exchanging unit for energy-wise efficiently, while forcing hot external fluid through the tubes of the fin and tubes heat exchanger, is to heat fluids A and B, i.e., milk to be pasteurized both upstream and in the second heat exchanger zone 110B, and cooling it back downstream the second heat exchanger zone 110B. That results in improving in the economic efficiency of pasteurization process.

This invention may further involve implementing cheap materials such as plastic plates. Furthermore, volume occupation efficiency where for a given volume occupied by the energetic process to be done, with given conditions, provides larger yield with low energy consumption and lower noise level if desired.

Reference is now made to FIG. 1E. Leakages of fluid which leak through gaps existing between the fin and the plate, as well as gaps between blocking protrusion and the adjacent plate, contribute to reduction in the effectivity of the heat transfer because these leakages a portion of the inlet air does not fully follow the designated heat exchange pathway. For example, a leak denoted herein as "type I" 140 is a portion of the air flow A which arrives from the inlet zone and the first heat exchanging zone, instead of passing over the fin, passes through the gap 142 between the fin and the plate from one side of the plate to the other side, where it merges with a counter fluid flow B and exits the plate through the flow outlet, without substantially flowing over the fin. Another type of leak, denoted herein as "type II" 150, relates to air which, instead of entering through the fluid entry zone, enters the plate through gaps between the blocking protrusions and the adjacent plate, merges with the main fluid flow B over the plate and exits the plate through the fluid outlet without effectively exchanging heat according to the designated flow pathway. Air which enters at a location downstream the second heat exchange zone, i.e., downstream the fin, may have no interaction with the fin whatsoever.

Therefore, the efficiency of the heat exchange thus depends, among other factors, on the degree of alignment of the void in the surrounding plates 112, 114 with the corresponding fins 110B and sealing the gap between them to mitigate the deficient heat exchange caused due to the type I leakage. Mitigating the type II leakage is performed by sealing the gaps between the outer edges of blocking protrusions of one plate and the outer edges of the adjacent plate.

The inventors of the present invention found a way to facilitate the alignment of the void of the plate with the corresponding fin and the sealing of the gap between the fin and the plate by physical attachment of the fin to the plate through an overlap peripheral margin of the fin and a margin surrounding a void in the plate to which the fin is coupled. In some embodiments, the void in the plate is a cutout in the plate. In some embodiments, the plate is a combination of at least two sub-plates which are separated from each other, and the void is the space between the at least two sub plates. In some embodiments, the plate is a combination of at least two sub-plates attached to each other, and the void is generated according to the outline of the edges of the sub-plates.

Figure 2A:
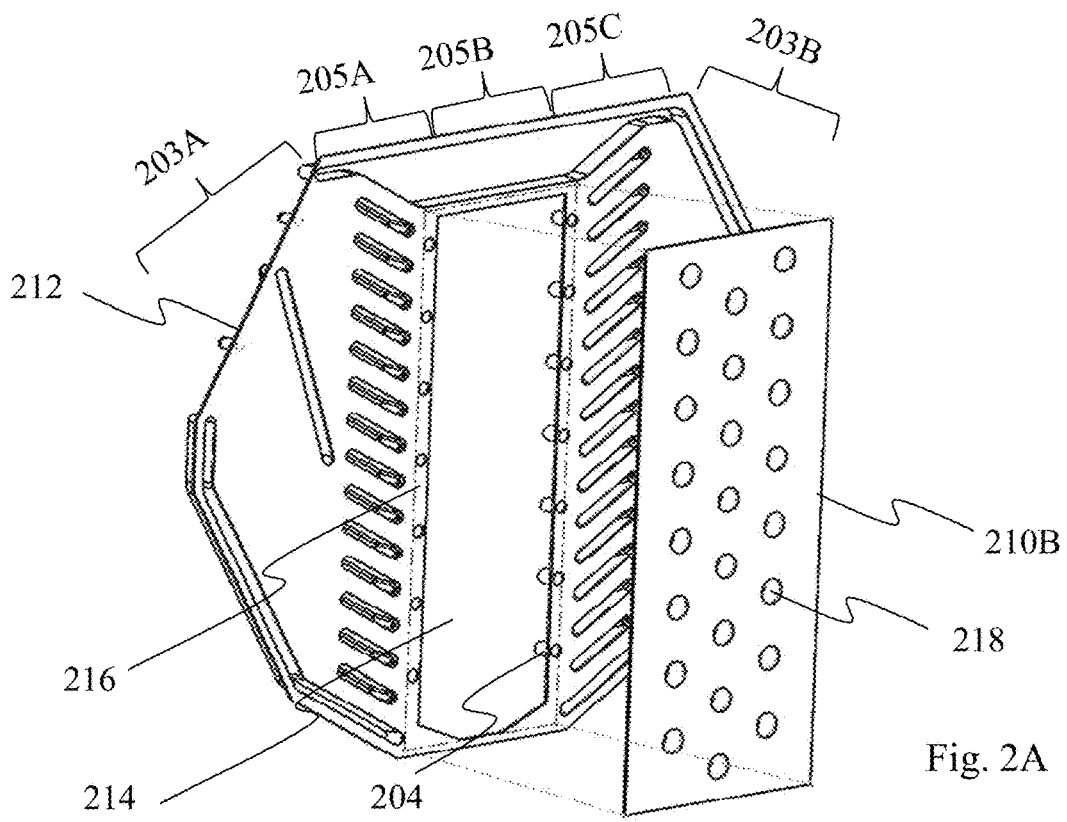
FIGS. 2A and 2B are front and back schematic illustrations, respectively, of a SFP according to some embodiments of the present invention.
Figure 2B:
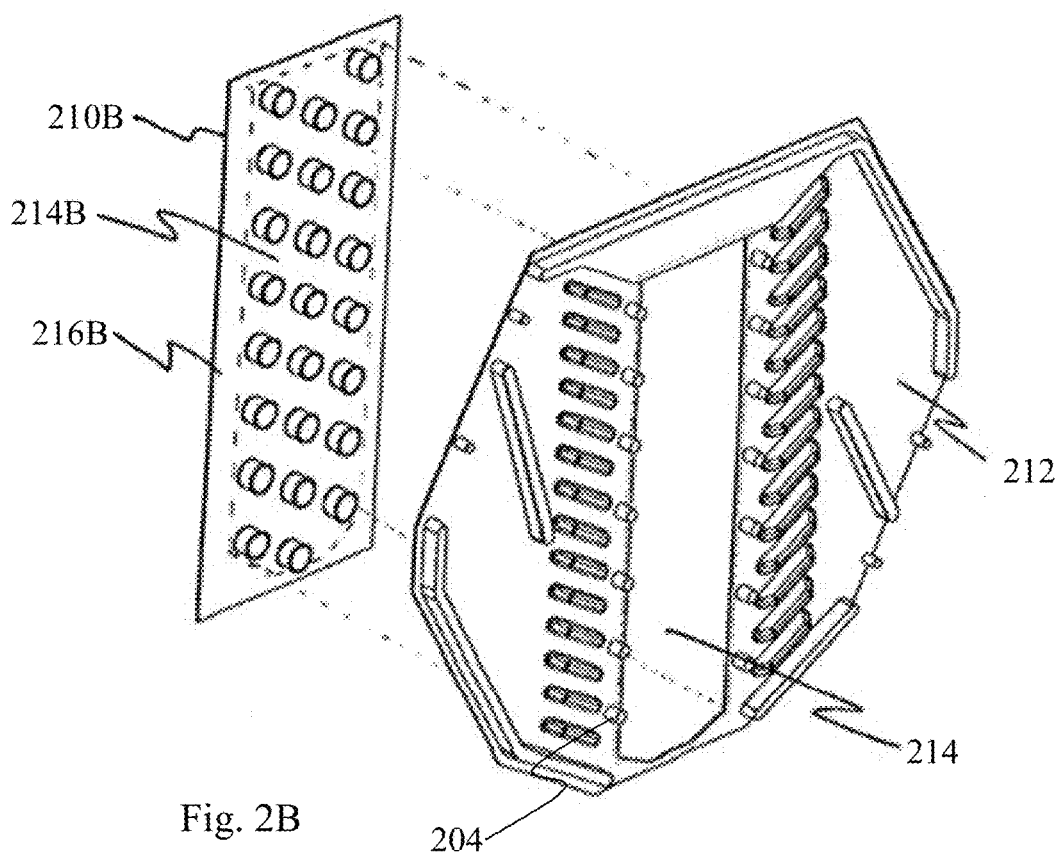

Reference is now made to FIGS. 2A and 2B which are a back and front exploded view drawings of a "set of fin and plate (SFP)" defined as a coupled pair of a plate of a plates heat exchanger and a fin of a fins and tubes heat exchanger according to an embodiment of the present invention. Plate 212 is one plate out of a stack of plates defining a plates heat exchanger, and fin 210B is one fin out of a stack of fins of a fins and tube heat exchanger. Plate 212 comprises fluid inlet and outlet zones 203A and 203B, respectively, a first heat exchanger zone 205A, a second heat exchanger zone 205B comprising a cutout 214 defined by internal edges of the plate and having an area smaller than the area of fin 210B, and a third heat exchanger zone 205C. When stacked in the HEFTAP, the SFP functions in a similar fashion to the SFP depicted in in FIG. 1D but in an improved manner. In some embodiments, the cutout 214 is at the central area of the plate 212, and in some embodiments, the cutout 214 can be off-centered. Fin 210B comprises at least one tube through hole 218 each through hole 218 adapted to accommodate and be coupled with a penetrating heat exchanging tube (not shown). The term "through hole" refers to a hole that passes from one side of the article to the other side. In some embodiments, protruding flanges may extend from the circumference of the through hole. As the cutout 214 has a smaller area than the fin 210B, then, when the fin is attached to the plate to overlap with the cutout 214, only a portion 214B of the fin 210B is exposed through the cutout 214 while a peripheral margin 216B of the fin 210B overlaps with a margin 216 surrounding the cutout 214. Consequently, fluid (e.g., air) flowing over either side of the plate 212 comes in direct contact with the fin 210B. The wider the overlapping margin, the more effective is the sealing between the fin and the plate, and the more robust is the coupling of the two. On the other hand, a wider overlapping margin narrows the area of the exposed fin, which is where the most effective heat transfer occurs. In some embodiments, the overlapping margin 216B is between 1 mm to 5 mm wide in order to reduce leakages between flows A and B in the overlapping margin of the plate and the fin. In some embodiments, the overlapping margin 216B is at least 0.3 to 10 mm wide. In some embodiments, the overlapping margin 216B is at least 0.3, 0.4, 0.5, 0.6, 0.7, 0.8, 0.9 or 1.0 mm wide.

In some embodiments, only a portion of the periphery of the of the fin overlaps with the surface of the plate while other portions closely fit with the edges of the cutout. In some embodiments, between 50% to 99% of the periphery of the fin is overlapping with the surface of the paired plate when the plate and fin are coupled to each other. In some embodiments at least 60%, 70%, 80%, 90%, 95%, 98% or 99% of the periphery of the fin is overlapping with the surface of the paired plate when the plate and fin are coupled to each other.

The cutout 214 accommodates a portion 214B of the fin 210B comprising at least one heat exchanging tube. In the embodiment depicted in FIGS. 2A-2B, cutout 214 accommodates the entire area of the fin 210B comprising the tube holes 218. In some embodiments, the portion of the fin 214B is slightly elevated from the plane of the peripheral margin 216B so when the fin is attached to the plate, the portion 214B is coplanar with the plate 212. In some embodiments, when the portion 214B is elevated it facilitates locating fin 210B properly in the cutout 214. In some embodiments, the margin 216 is slightly elevated from the main plane of the plate (in some embodiments by 0.1 mm-2 mm) to facilitate the placement of the fin 210B in the cutout 214.

In some embodiments, the fin 210B is adhered to the surface of the coupled plate 212. In some embodiments, an adhesive is applied to the overlapping margin 216B of the fin 210B, to the overlapping margin 216 of the plate 212 surrounding the cutout 214 or applied to both. In some embodiments, adhesive is applied over the boundary line between the fin 210B and the plate 212 when the fin and plate are attached to each other.

Plate 212 is embossed to channel a fluid flow from an inlet zone to a first heat exchanging zone over the plate then to a second heat exchanging zone between two fins, then through a third heat exchanging zone over the plate and then through a fluid outlet zone. In some embodiments, as explained above, there are two possible mirror images of embossments, such that when the two plates are stacked in an alternating fashion counter flow of fluid above and below the plate is obtained. In some embodiments, the same embossment produces a fluid flow to a different direction due to a different orientation of the plate relative to the longitudinal axis of the stack of plates.

It is noted that the term "between the heat exchanging zones" relates to a zone inclusive of the plates and fins themselves as heat exchanging takes place on the fins and on the plates as well.

In some embodiments, the plates are made of low heat-conductive material such as plastic and the fins (as well as the tubes) are made of a high heat conductive material such as a metal or metal alloy. In some embodiments, the plates are made of a material having a thermal conductivity of less than $$5\frac{W}{m\cdot °C}.$$

In some embodiments, the fins are made of a material having a thermal conductivity higher than $$50\frac{W}{m\cdot °C}.$$

The advantage of using a low heat conductive material for the plates and a high heat conductive material for the fins is explained in U.S. Patent Application Publication No. 2014/0261764. In some embodiments, the fin and/or the tube are made of aluminum, aluminum alloy, copper, copper alloy, or stainless steel. In some embodiments, the plate comprises attaching protrusions 204 dispersed in the peripheral margin area 216 surrounding the cutout 214 which overlaps the peripheral margin 216B of the fin for pressing the fin 210B to an adjacent plate or to the same plate 212 as will be discussed in more detail later.

In another aspect, the invention provides a HEFTAP comprising a stack of the SFPs of the invention, as defined above. Stacking and aligning SFPs forms a HEFTAP comprising a fins and tubes heat exchanger and a plates heat exchanger wherein at least a portion of the fins of the fins and tubes heat exchanger being at least partially attached to plates of the plates heat exchanger. In some embodiments, some of the fins and/or plates remain uncoupled. In some embodiments, fins of the fin and tubes heat exchanger are attached to the plates on all sides of the fin. In some embodiments, a portion of the edges of the fin is unattached to the plate.

Each one of at least a portion of the fins is at least partially attached to a plate to define a set of a fin and a plate (SFP) wherein the fin is at least partially hermetically overlapping the void of the plate, and at least a portion of a peripheral margin of the fin is attached to a portion of a peripheral margin around the void of the plate such that fluid flowing over either side of the plate comes in contact with the fin.

According to some embodiments, at least one of: (i) an alternating order of differently embossed plates; and (ii) an alternating orientation of plates in the stack (relative to the longitudinal axis of the stack), is adapted to enable a simultaneous counter fluid flow, cross fluid flow or semi counter-cross fluid flow above and below the SFP. In some embodiments, a pair of SFPs enables a fluid flow scheme which is a combination of at least two of a counter fluid flow, a cross fluid flow and a semi counter-cross fluid flow. For example, in the pair of SFPs depicted in FIG. 1, there is a cross fluid flow between the inlet and the outlet regions, a counter flow between the fins and combination of counter fluid flow and semi cross-counter fluid flow in between the first and third regions. In some embodiments, the stack of SFPs can enable in the same HEFTAP more than one of a simultaneous counter fluid flow, cross fluid flow or semi counter-cross fluid flow above and below the SFP. To this end, the stack comprises at least two pairs of adjacent SFPs, each providing one of a counter fluid flow, cross fluid flow or semi counter-cross fluid flow, wherein each pair provides a different type of fluid flow. For example, at least one pair of adjacent SFPs provides a counter fluid flow while at least one other pair of SFPs provides a cross fluid flow.

Due to the overlap between the fins and plates, an improved HEFTAP is obtained in comparison to the HEFTAP of the prior art, characterized by having fewer air leaks, more efficient heat exchange and increased structural durability and intactness.

In some embodiments, an alternating order of differently embossed plates is adapted to enable a concomitant counter fluid flow, a cross fluid flow or a semi-cross counter fluid flow in front and behind the plate, and provides the HEFTAP with at least two sets of flow inlets and two sets of flow outlets, as demonstrated in U.S. Patent Application Publication No. 2014/0261764 or further herein.

In some embodiments, an alternating orientation of plates in the stack is adapted to enable relatively counter fluid flow in front and behind the plate. For example, in some embodiments, the plates have a single embossment design which when stacked in a head to tail arrangement enable the desired counter fluid flow.

Figure 3:
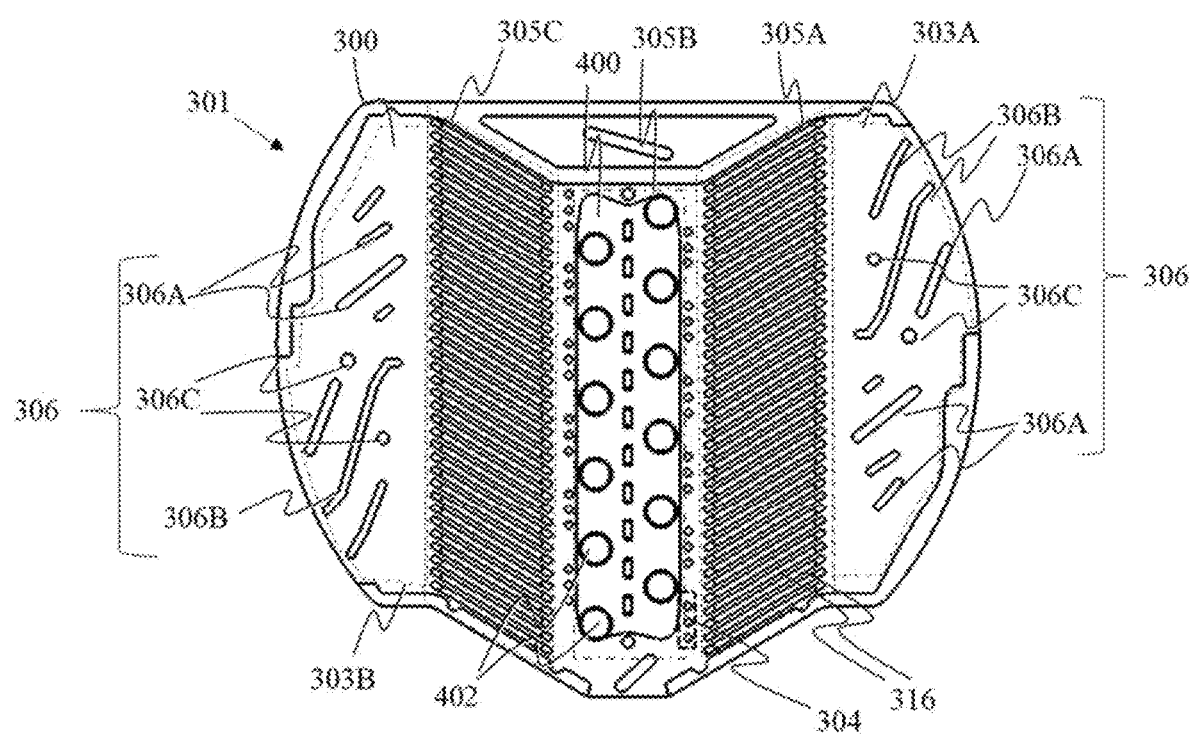
FIG. 3 is a front view of a SFP according to an embodiments of the present invention.

Reference is now made to FIG. 3, which depicts a front view of a SPF made of a plate 300 coupled to a fin 400 according to an embodiment of yet another aspect of the present invention.

Each SPF, which is defined as the combination of a plate 300 and a fin 400, comprises three heat exchanger zones 305A, 305B and 305C. Heat exchanging zone 305B generally corresponds to the exposed portion of the fin 400 through the cutout of the plate 300. Heat exchanging zones 305A and 305C generally correspond to the areas of the plate which are located upstream and downstream with respect to the direction of flow of fluid over the SPF of heat exchanging zone 305B on each side, respectively.

In some embodiments, along the perimeter of the cutout in proximity thereto are disposed groups of attaching protrusions 304, adapted to keep a next fin attached to a peripheral margin around a cutout of the next plate or of the same plate and to reduce or eliminate the gap between the next fin and the next plate. The attaching protrusions 304 are also designed to allow air flow to pass through from the first heat exchanger zone 305A to the second heat exchanger zone 305B, and from the second heat exchanger zone 305B to the third heat exchanger zone 305C. To this end, according to some embodiments, the attaching protrusions 304 are designed as groups of separated dot-like protrusions. In some embodiments, as depicted in FIG. 3, the attaching protrusions 304 are disposed on the surface of the plate 300 opposite to the surface to which the fin of the SFP is attached.

According to some embodiments, the attaching protrusions are disposed on the surface of the plate to which the fin is supposed to be attached. In these embodiments, the protrusions comprise a snatching groove (not shown) designed to attach the fin in close contact to the plate while keeping a distance from the next plate of the next SFP. The fin can snatch into the groove on its edges or through complementary holes within its surface.

In some embodiments, the attachment protrusions are dispersed on the peripheral margin of the fin (not shown), in addition to, or substituting, the attachment protrusions dispersed on the plate or to substitute these protrusions. In some of these embodiments, the attachment protrusions are directed to one side. In some embodiments, the attachment protrusions comprise a groove to enable snatching of the protrusions with the surface of the plate once the protrusions are pressed through a complementary aperture in the surface of the plate.

The inventors of the present invention have found that an increase of heat exchange efficiency in a heat exchanger constructed from the heat exchanging plates complying with the general structure detailed above is obtained by designing embossment of uniformizing protrusions 306 in the fluid inlet zone 303A and/or in the fluid outlet zone 303B. Those protrusions are configured to reduce the amount of non-uniform fluid mass flow between different channel protrusions 316 in the first and in the third heat exchanging zones, 305A and 305C, respectively (i.e., to reduce the variance in fluid mass flow at one channel in comparison with another channel in the same heat exchanging zone), and along the second heat exchanging zone 305B over fin 400. In some embodiments, where the first or third heat exchanging zones lack channel protrusions 316, the uniformizing protrusions reduce the amount of non-uniform fluid mass flow between different channel protrusions 316 in the heat exchanging zone having channel protrusions. The channel protrusions 316 are set of parallel longitudinal evenly dispersed protrusions, which channel the fluid flow from the entry to the second heat exchanging zone to its exit or from the entry to the third heat exchanging zone to its exit. to the entry. The inventors have further found that uniformity of the fluid mass flow along the channels 316 (i.e., that different channels in the same zone have the same or closely the same mass flow) in the first and third heat exchanging zones 305A and 305C, respectively, can be further optimized by adjusting the shape of the channels 316 their respective location and the distances between adjacent channels on the plate 300. In some embodiments, fluid flow channels in at least one of the first and third heat exchanging zones comprise at least one bent line protrusion in proximity to the inlet or outlet zone, respectively In some embodiments the topology of uniformizing protrusions 306 in the fluid entry and/or fluid outlet zones 303A and 303B, respectively, comprises at least one, in some embodiments at least two, of a straight line protrusion 306A a bent line protrusion 306B, a dot protrusion 306C, unevenly spaced protrusion lines, non-parallel protrusion lines, non-aligned starting points and non-aligned end points. In some embodiments, the broken line protrusion is selected from at least one of a L-shaped and a S-shaped line.

The effectiveness of the aforementioned topology of the uniformizing protrusions towards a more uniform mass flow is evaluated by running computerized fluid dynamics (CFD) simulations which are performed on the full design of the SFP being sandwiched between two adjacent SFPs. According to the results of the simulation, the person of skill in the art can modify the initial topology and rerun a CFD simulation in order to determine whether the modification reduces the non-uniformity mass flow in the first and/or in the third heat exchanging zones, 305A and 305C, respectively, and/or along the second heat exchanging zone 305B over fin 400. Such modifications may include elongation of protrusion lines, altering curves, changing the protrusion height, changing the angle of attack of the protrusion, changing a space or relative angle between two protrusions and so on. By running several iterations of modifications of the topology and CFD simulations, an optimized topology is obtained. In some embodiments, the CFD application can automatically perform fine tuning optimization of a given topology to achieve said reduction in the non-uniformity mass flow.

In some embodiments, the uniformizing protrusions are designed to provide a uniform fluid mass flow, or at least reduce the deviation of the mass flows along the channel protrusions 316 in the first and/or third heat exchanging zones 305A and/or 305C, respectively, and/or along the second heat exchanging zone 305B over fin 400, and in some embodiments even in cases when the direction of the flow is reversed, i.e., when the fluid flows from zone 303B to zone 303A. In some embodiments, the channeling protrusions are designed to reduce the deviation of the mass flows, for example by introducing a bend in proximity to the inlet and/or outlet zone (not shown).

The term "uniform fluid mass flow" refers to maximum mass flow rate deviation of 30%, in some embodiments 10% or 20%, from the mean flow rate along at least 80%, in some embodiments at least 85%, 90% or 95%, of the channels in the heat exchanger zone 305A or 305B.

Reference is made to FIGS. 4A-4E, which depict a front view of a fin 400 of a fins and tubes heat exchanger; a side view of that fin; local cross section of fin 400 along line A-A; isometric view of that fin; local cross section of fin 400 along line B-B; and enlarged partial view of fin's side view, respectively, according to some embodiments of another aspect of the present invention.

In order to improve the heat exchange factor between the counter flow air streams above and below each surface, and in order to provide means for equalizing air pressure between the various air flows, in particular counter or cross air flows above and below the same fin in the a series of through fluid apertures (with respect to the main plane of the fin) 404A may be perforated in fins 400 of the fins and tubes heat exchanger allowing fluid passing through from one side of the fin 400 to the other. The term "through fluid apertures" should be distinguished from the through holes mentioned previously by that while the through holes are supposed to be coupled with a heat exchanging fluid when the heat exchanger is assembled and do not enable flow of treated fluid (e.g., air) through them, then the through fluid apertures remain open for the treated fluid to pass from one side of the fin to the other side, when the heat exchanger is assembled and operating.

In some embodiments, the through apertures 404A are bypassed by a protrusion 404B. For example, in the embodiment depicted in FIG. 4A, the apertures 404 are in the form of hollow dents having apertures 404A bypassed by protrusions 404B which are all perforated to the same direction with respect to the main plane of the fin 400. In some embodiments, the perforations may be distributed above and below the plane of the fin. In other embodiments, the apertures are holes in the fin without a perforation bypassing the aperture. In some embodiments, the through apertures are essentially located in an area where the differential static pressure between two sides of the fin, when no holes are made in the fin, and when air flow is flowing from first inlet to first outlet and had a second airflow is flowing from second inlet to second outlet, is approximately equal, and in some embodiments less than 30%, in some embodiments less than 20%, and in some embodiments less than 10%, of the pressure drop between the inlet and the outlet. The term "approximately" refers herein to a deviation of up to 20% from the value to it relates to. In some embodiments, the through fluid apertures are essentially aligned with a straight or curved line in which the differential static pressure between two sides of the fin is minimal. In some embodiments, the aforementioned differential pressure is less than 30%, in some embodiments less than 20%, in some embodiments less than 15% of the pressure drop between the opposite streamlines on both sides of the fin, if the fin had not comprised the apertures. The term "essentially aligned" as used herein means that the location of the center of an aperture deviates from the aforementioned line by up to 1 mm, in some embodiments up to 2 mm or up to 5 mm, in some embodiments up to 1%, 3%, 5%, 7% or 10% of the length of the streamline over the fin and the plate. In some embodiments, this line is determined according to computerized fluid dynamics (CFD) simulation which is performed on the airflows flowing between at least three sequential adjacent SPFs. The person of skill in the art would know how to perform a CFD simulation and find the equal air pressure line.

In some embodiments, the fin comprising the through fluid apertures also has an area larger than the area of the cutout of the coupled plate.

In some embodiments, the heat exchange tube holes 402 are evenly distributed about the at least one through fluid aperture. In some embodiments, at least two cooled fluid tube holes are evenly distributed about the at least one through fluid aperture.

Heat exchanging fluid tube hole 402 is made to accommodate penetrating heat exchanging fluid tubes (not shown). As seen in FIG. 4F, through fluid aperture 404 comprises an aperture 404A which is bypassed by protrusion 404B formed, for example, by using a respective punching tool. Grey arrow 4000 depicts schematically a possible path of fluid for flowing through aperture 404 from the back face of fin 400 to its front face (and vice versa).

Figure 5A:
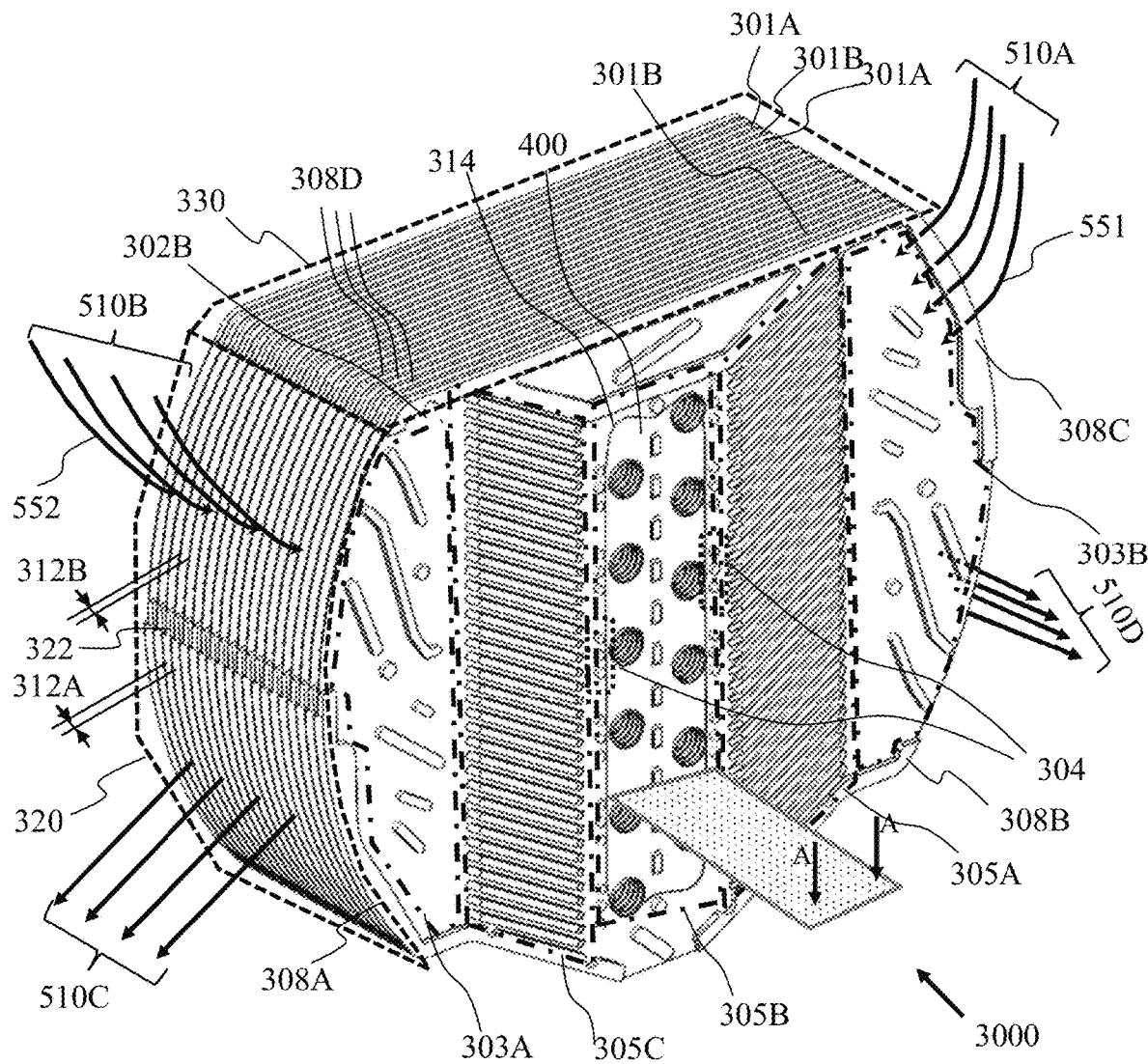
FIGS. 5A-5E are: an isometric view of a heat exchanger (FIG. 5A); a top view of a partial cross section view through the fins of the heat exchanger along plane A-A in FIG. 5A (FIG. 5B); a side view of possible selective sealing of gaps between plates of the heat exchanger (FIG. 5C); and isometric views of a heat exchanger before and after selectively sealing gaps with a sealant (FIGS. 5D and 5E, respectively) according to some embodiments of the present invention.
Figure 5B:
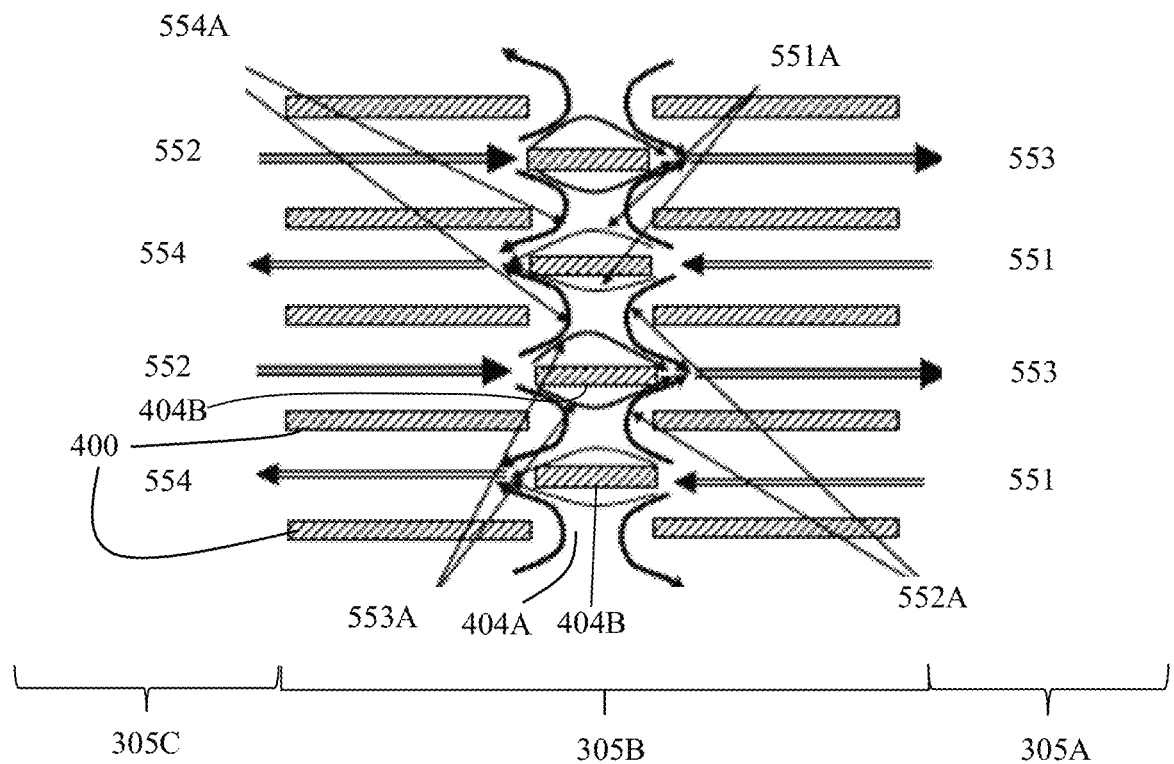
Figure 5C:
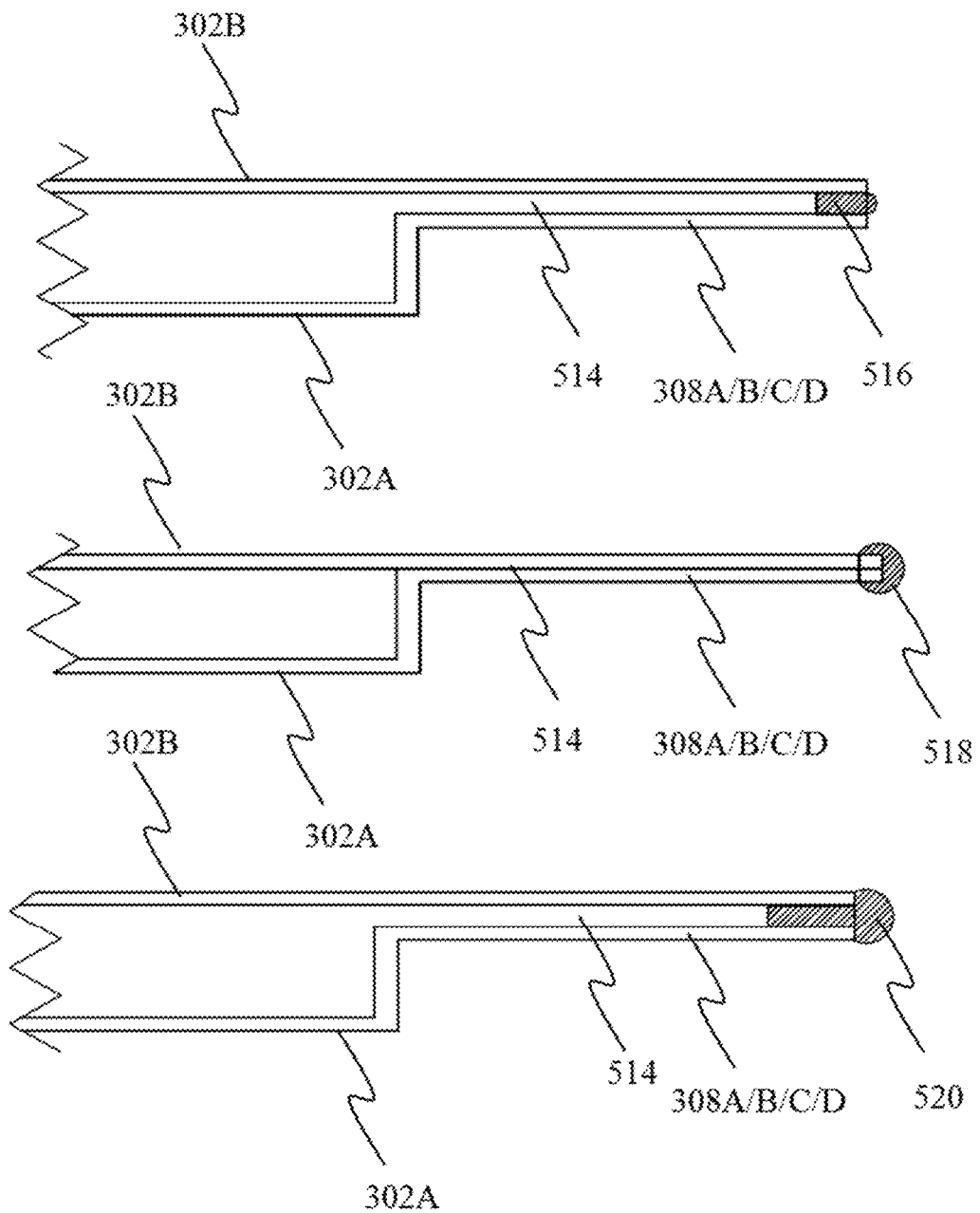

Reference is made to FIGS. 5A-5B which are an isometric view of HEFTAP 3000, and FIG. 5C is local partial cross section view through the fin 400 along plane A-A in FIG. 5B, respectively, according to some embodiments of the present invention. HEFTAP 3000 comprises an alternately stacked set of SFPs 301A and 301B, each SFP defined by a paired plate (302A or 302B) and fin 400, and which are arranged alternately in an interchanging order as explained above. In some embodiments, SFPs 301A and 301B differ from each other by the essentially mirror image embossment of their respective plates 302A and 302B or at least by having an essentially mirror image of the flow pattern that they channel when stacked. The plates 302A and 302B comply with the general structure of having a fluid inlet zone 303A, a first heat exchanger zone 305A a second heat exchanger zone 305B comprising cutout region defined by a cutout curve 314, a third heat exchanging zone 305C and a fluid outlet zone 303B. The plate and the fin of each SFP are adjacently attached to each other at the cutout region of SFPs 301A and 301B through a peripheral margin of the fin 400 overlapping with a peripheral margin around the cutout of the plate.

Air flow 510A is a first air stream, entering HEFTAP 3000. Air flow 510B is a second air stream entering HEFTAP 3000. Air flow 510C is a third air stream, leaving HEFTAP 3000, and air flow 510D is a fourth air stream, leaving HEFTAP 3000.

The structure of HEFTAP 3000 is designed to form a triple heat exchanging device. Reference is made specifically to FIG. 5B which depicts the various air streams flowing between fins 400 of HEFTAP 3000 when the HEFTAP 3000 is operating. FIG. 5C depicts top partial and local cross section through HEFTAP 3000 and along cross section line AA in FIG. 5A.

Airstream 551 is a first air stream originating from 510A which passes through first heat exchanger zone 305A, flowing between plates 302A and 302B, then through part of the first portion of second heat exchanger zone 305B flowing mainly between the fins 400 and then, at dent 404, at least first and second sub-flows 551A and 552A split from first air stream 551, while portion of first air stream 551A continues forward to merge with fourth air stream 554, as is explained herein below.

Airstream 552 is a second air stream, originated from 510B, which passes through third heat exchanger zone 305C, flowing between the plates 302A and 302B, then through part of the second heat exchanger zone 305B between the fins. At dent 404, the stream splits at least into a third and a fourth sub-flows 553A and 554A, respectively, while portion of second air stream 553A continues forward to merge into third air stream 553, as is explained herein below.

Second and third sub-flows 552A, 553A unite to form third air stream 553 which flows over the first portion of second heat exchanger zone 305B mainly between the fins 400, then flows in the first heat exchanger zone 305A in an opposite direction with respect to the first airstream 551, and exits the HEFTAP as flow 510C.

First and fourth sub-flows 551A and 554A, are united to form airstream 554 which flows over part of said second zone 305B of the second SFP, then flows in the third zone 305C of the SFP in a different direction with respect to airstream 552, and exits the HEFTAP as flow 510D.

Airstreams flowing over the opposite side of each fin 400 are flowing in opposite directions with respect to each other.

The first zone 305A of the SFP 301A or SFP 301B is designated to exchange heat between the first airstream 551 and the third airstream 553. The third zone 305C of the HEFTAP is designated to exchange heat between airstream 552 and airstream 554. The second heat exchanger zone 305B is designated to cool or heat—depending on the application of the heat exchanger. In some embodiments, the second heat exchanger zone 305B is hot, for example, for pasteurization. the airstreams and the sub-flows by external cooling (or heating) fluid, originated from outside of the HEFTAP.

Without being bound to theory, the dents, together with the counter-flow/cross flow/semi-counter cross flow scheme in the fin 400 (i) mix the flows and renew the boundary layer of the flow. By doing so, the heat convection factor between the fins and the flows (and in some embodiments also between the plates and the flows) is increased. (ii) reduce the deviation of the mass flow rates on both sides of first heat exchanger zone 305A; (iii) and reduce the deviation of the mass flow rates on both sides of 3rd heat exchanger zone 305C.

As previously described, the high efficient heat transfer relies on the lateral (i.e., along the axis of the heat exchanger perpendicular to the stack of SFPs) counter flow or cross flow or the partially cross-counter flows of fluid, in particular air, over adjacent passages on either side of each SFP of the HEFTAP. Sub-flow crossing 140 from flow 510A over to the adjacent flow 510C on the other side of the SFP (and/or 510D in some designs) occurring before about halfway of the flow in the second heat-exchanger zone 305B (type I leakage) and/or leakages between flows 510B and 510D (and/or 510C in some designs) occurring before about halfway of the flow in the second heat exchanging zone 305B might have different effects: (i) in order to pass a given amount of airflow through first heat exchanger zone 305A and third heat exchanger zone 305C, the total capacity of airflows 510A and 510B should be increased to compensate for such leakages, a fact that increases the total noise of the system and sometimes even the energy consumption; (ii) if the leakages of flow 510A and flow 510B are not relatively even, each of the heat exchanger zones 305A and 305B will lose efficiency; and (iii) the leakage, on the other hand can be attended, by increasing flows 510C and 510D in order to keep flow through heat exchanger zone 305B as desired (although the noise level increases).

The counter flow of the HEFTAP is made possible due to selective zones of blocking and opening of fluid passages between pairs of adjacent relatively planar SFPs comprising embossed plates coupled to fins. The inventors of the present invention have found that, in the preparation of a HEFTAP, such as the one disclosed in the present invention, gaps between adjacent stacked plates comprising peripheral lateral embossment having protrusions with the proper height, can be efficiently and selectively sealed at specific locations intended to be blocked for fluid passage while locations intended to be open for fluid flow remain open by unselectively applying an adhesive to a face of the HEFTAP, exposing said protrusions.

To this end, in some embodiments of the invention, the HEFTAP comprises at least one plate with lateral peripheral protrusions wherein said plate is designed to form, at peripheral locations intended to be sealed when the plate is stacked with another plate, at least one of:

a gap between the peripheral protrusions and a surface of an adjacent plate facing the peripheral protrusion, being sufficiently narrow to enable applied adhesive to fill the gap; and an outer lateral width of the two plates at said locations is such, that an applied adhesive encircles the outer edges of the plates at these locations.

In some embodiments of present invention, the plate is designed to form a gap between the edge of the plate and the edge of the adjacent plate facing the first plate at locations where the gap should remain open (for example—inlets and outlets). Said gap should be larger than a gap allowing an applied adhesive to fill or to encircle the gap such that the gap remains open.

The term "lateral" means in a direction perpendicular to the main plane of the referred object. In the context of the lateral peripheral protrusions, the wording refers to protrusions being in direction perpendicular to the main plane of the plate, such that when the plate is stacked together with the plates, the lateral protrusion fills at least part of the gap between two adjacent plates. In some embodiments, the peripheral protrusions may additionally have a parallel extension, e.g. outward from the main circumference boundary of the plate.

In some embodiments, the plate having the peripheral protrusions as explained above is coupled with a fin to form a SFP according to the invention and the SFPs are stacked to form a HEFTAP according to the invention or as previously described in U.S. Patent Application Publication No. 2014/0261764.

In some embodiments, the locations at which the gap between two adjacent SFPs should remain open to fluid flow and locations at which they should be sealed reside on the same side of the plate. In some embodiments they reside on the same face of the HEFTAP.

In embodiments where adhesive fills the gap at the edge between two adjacent plates, it is not necessarily needed to fill the entire gap between the plates from the edge inwards with adhesive. The extent to which the adhesive should fill the plate depends on many factors, including the properties of plates used, in particular the hydrophobicity, roughness and surface tension of the surface, the size and weight of the plates, the application of the heat exchanger, and the type of adhesive used. In some embodiments, where the plates are PVC plates the gap between the plates is sealed by the adhesive at the edge by 0.2 mm to 10 mm inwards from the circumference of the plates.

In some embodiments, the gaps are designed to be selectively sealed by heat instead of using an adhesive. To this end, the plates comprise lateral protrusions designed to form sufficiently narrow gaps between the edge of the plate and the edge of the adjacent plate facing the first plate, at locations intended to be sealed, to enable the edges of the plates to melt and coalesce upon applying heat, and at locations intended to remain open, the gaps between the edge of the plate and the edge of the adjacent plate facing the first plate should be wider than a gap allowing the edges of the plates to melt and coalesce upon applying heat. This same principle may be applied when ultrasonic welding is used. The exact size of gap at each location is dependent on the type of material at said location, its width and the heat that is applied. However, the person of skill in the art would be able, given these parameters to design the plates and the means and method for applying selective sealing accordingly.

Other means for selective sealing using this principle of having narrow vs. wide gaps are also within the scope of this invention, for example, sealing with ultrasonic welding.

With reference to FIGS. 5A, and 5C, the peripheral protrusions 308A-308D are laterally extending from the surface of the plate on the edge of the plate. The protrusions 308A-308D are located at locations which are supposed to block air flow from entering into the gap between the plate and an adjacent plate. The sides of the protrusions 308A-308D which are perpendicular to the surface of the plate, are supposed to function as blockage for air flow along the portion of the edge at which they are located. Concomitantly, portions 308E and 308F of the edge of the plate 301A and the back of plate 301B define a passageway 312A which is supposed to allow air flow to enter or exit the gap between the aforementioned two plates. Similarly, the corresponding portions on plate 301B and the back of plate 301A define a passageway, or gap, 312B.

Figure 5D:
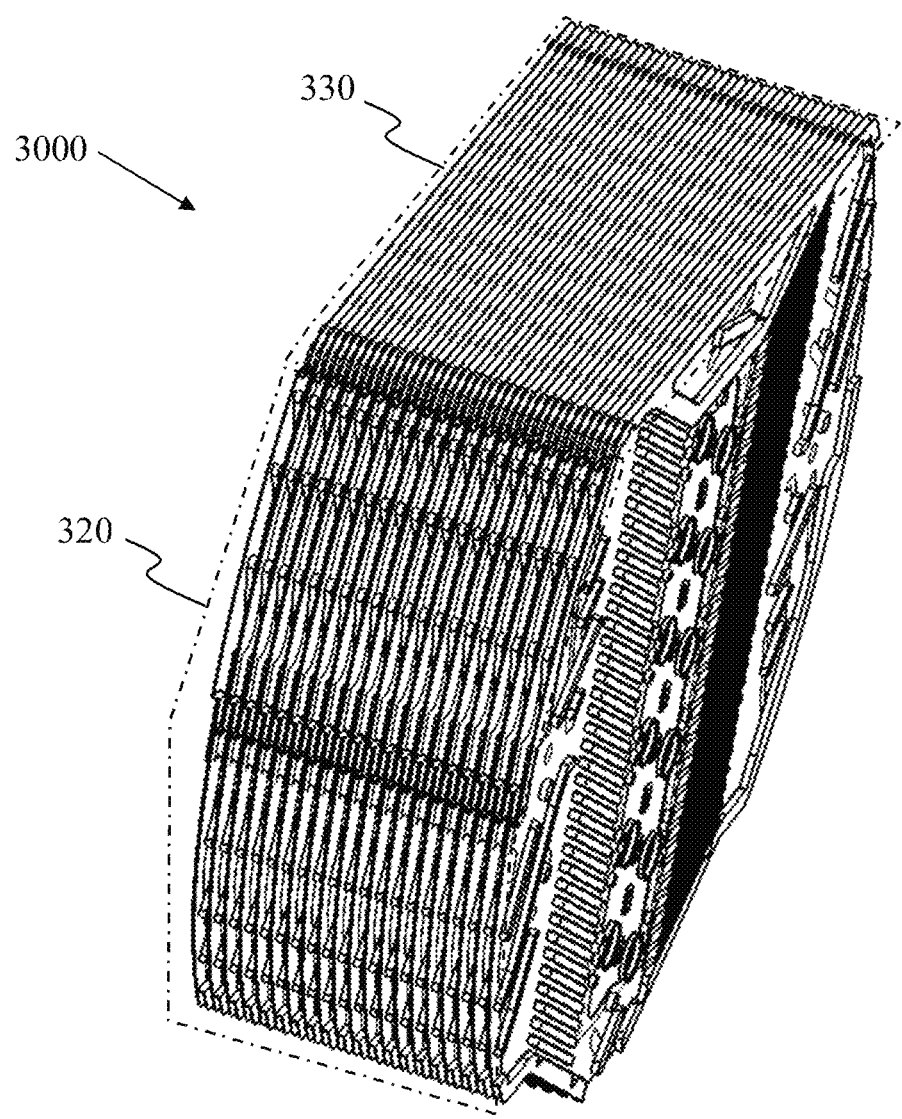
Figure 5E:
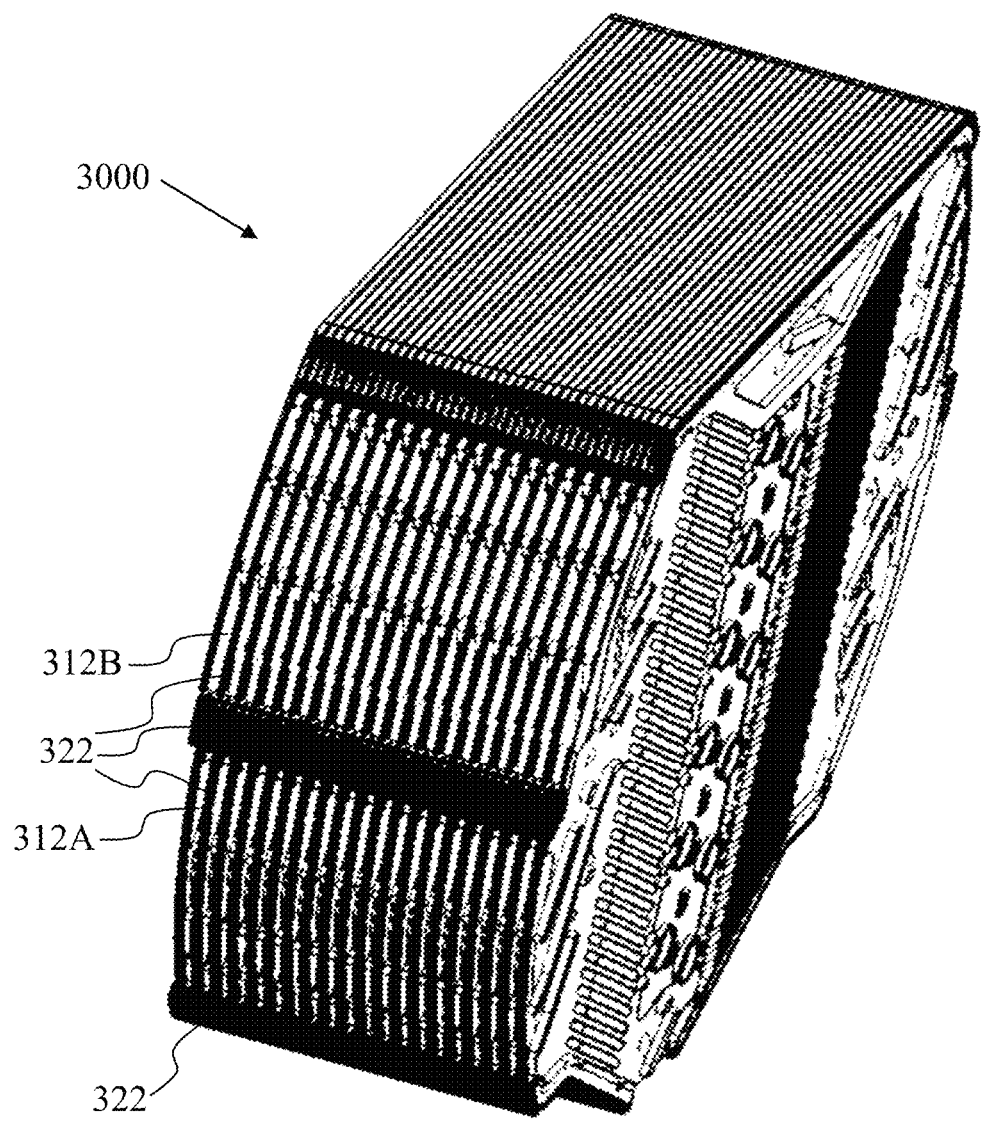

Reference is now made to FIGS. 5C-5E. As previously explained, in order to increase the efficiency of the counter airflow formation and reduce air leakage, the gaps 514 between the top of the protrusions 308A-308D (the side of the protrusions facing the adjacent plate) and the surface of said plate are sealed with a sealant. When using an adhesive as the sealant, or when the gaps are sealed by applying heat, an additional objective is met, namely adhering the plates to each other increases the robustness of the stack of plates. Much care had to be given when applying an adhesive to seal these gaps without accidently blocking the gaps which should remain open for air flow (e.g., between the portion 308E of the edge of the plate 302A and the adjacent plate 302B).

The inventors of the present invention have found that if (i) the gap 514 (FIG. 5C) between the top of the protrusions 308A-D and the adjacent plate is within the range to allow wicking of adhesive 516 into the gap 514, or (ii) the outer lateral width of the two plates at locations to be sealed is small enough to allow the adhesive to encircle 518 the outer edges of the plates at said locations, or (iii) both, then, to wick into the gap and to encircle it 520, adhesive may be unselectively applied to an entire face 320 of the HEFTAP 3000 (FIG. 5D) and obtain selective sealing only at the blocked locations 322 while leaving inlets and outlets open (FIG. 5E), on condition that gaps such as 312A or 312B (see also FIG. 5A) defining fluid flow outlet or inlet, respectively, are large enough to avoid the adhesive from adhering to the both bottom and top surfaces defining said entry. For comparison, face 330 of the HEFTAP 3000 is to be completely sealed. In some embodiments, gap 312A or 312B is at least the size of a drop of the adhesive being formed when dropped on a surface made of the same material of surface of the plate 302A and 302B. On the other hand, the maximal gap at locations intended to be blocked for fluid flow should be smaller than the diameter of said drop. In some embodiments, the lateral peripheral protrusions 308A-D are all equal and determine the highest protrusions on the plate 302A. Thus, when two adjacent plates are stacked together, the height of protrusions 308A-D determines the height of gaps 312A 312B. In such embodiments, the height of the protrusions 308A-D should be at least the size of a drop of the adhesive being formed when dropped on a surface made of the same material of surface of the plate 302A and 302B. In some embodiments, the adhesive forms a convex meniscus between the plates and in some it forms a concave meniscus. In some embodiments, a different type of adhesive is applied when selective sealing is required and when non-selective sealing is required.

The exact dimensions of the gaps, which are required for efficient selective sealing of the locations, which need to be sealed as opposed to locations which are required to remain unsealed, are dependent on the type of material from which the plates are made of, the sealant/adhesive used, the diluting solvent and the concentration of the sealant/adhesive. The aforementioned dimensions can be determined by a person skilled in the art for each specific case. Without being limited thereto, when the adhesive applied to gaps between PVC plates is Gray Galvanizing Totgum paint obtained from Denber Paints and Coatings Sderot Israel (Cat. No. 369002), and diluted by toluene/white spirit mixture (D-18 obtained from Denber Paints and Coatings Sderot Israel) at an adhesive to diluent ratio of between 1:2 to 1:3, the gap at locations intended to be blocked for fluid flow can be up to 0.7 mm, and the gap at locations intended to be open for fluid flow is at least 2.0 mm. In the aforementioned example, the adhesive is applied by brushing at room temperature and is dried by applying a heat at about 60° C.

In some embodiments, where the gap between edges of two adjacent plates is small enough and the capillary factor of the used sealant allows this, the straight face 330 of the HEFTAP 3000 (FIG. 5d) may be fully submerged in a liquidized sealant and be pulled out, and the capillarity of the sealant will cause it to hermetically fill and close the gaps between the plates in an efficient manner. In some embodiments, when a convex face 320 is treated, it is submerged sequentially in the liquidized sealant from one end of the face to the other end in a rate which allows the liquidized sealant to hermetically fill and close the gaps between the edges which are small enough and intended to be sealed. In some embodiments having a curved concave face the face is treated by other means such as brushing with a brush.

In some embodiments, instead of applying a sealant or an adhesive, the edges of the plates are heated such that small gaps coalesce and close the gap while large gaps remain open. Here again, trial and error experiments can determine the minimal required gap to keep the passages open, and the maximal gap which results in the coalescence of the edges, which depends on the type of material the plates are made of, the applied temperature and duration of applying heat. In some embodiments the gaps are coalesced by ultrasonic welding.

In some embodiments, an end plate is placed on the assembling surface prior to placing the first fin, and the first fin is laid on top of said end plate (601). In that case, the end plate comprises at least one through hole adapted to allow heat exchange fluid tubes to penetrate the plate.

Figure 6:
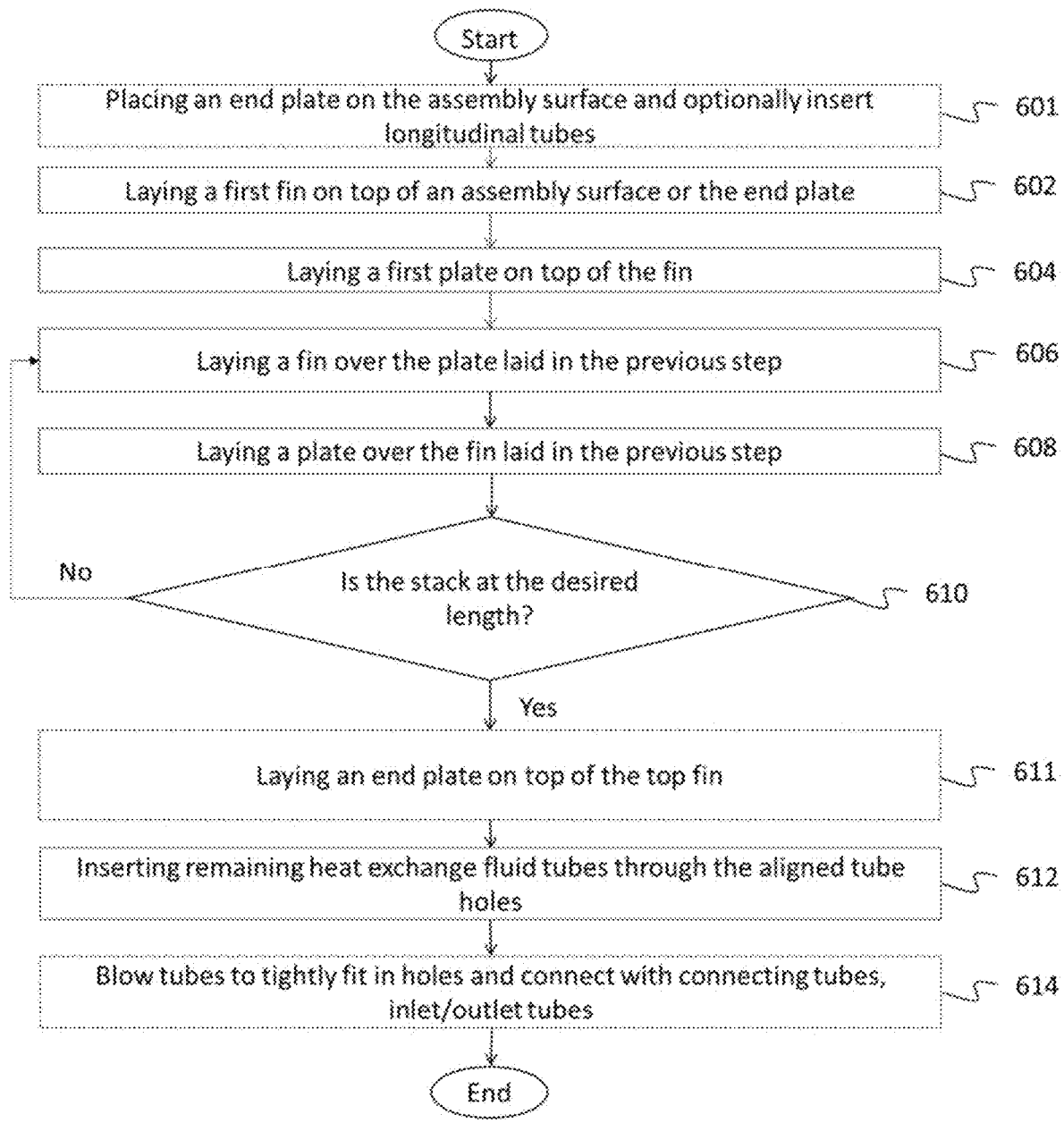
FIG. 6 is a flow chart depicting a method for producing a heat exchanger according to some embodiments of the invention.

The relative dimensions of the fin and the corresponding cutout of the plate according to the present invention dictate the method for producing a HEFTAP comprising the fin and the plate. Reference is now made to FIG. 6 depicting a flow chart describing a method for producing a HEFTAP according to the invention. A first fin according to the invention is laid on top of an assembling surface (602).

In some embodiments, prior to placement of the first fin, at least two longitudinal guiding tubes or rods are inserted through the through holes of the end plate (and in some embodiments the end plate is inserted through said guiding tubes or rods), and the fin is laid thereafter on top of the end plate (601) and is placed through the longitudinal tubes which act as guides for placing the fin (and the plate to follow) in the right place. In some embodiments, the tubes are heat exchange fluid tubes. In some embodiments, the at least two tubes are replaced by cylindrical guiding rods. In some embodiments, the end plate comprises sidewalls being lateral to the main plane of the plate adapted to confine the first layers of heat exchanging plates within the space defined by said walls. In some embodiments, the end plate comprises sidewalls being lateral to the main plane of the plate and extending away from the fin defining a housing for the connections between the longitudinal tubes. In some embodiments, a jig having a complementary structure is used as an aligning aid for stacking the fins and the plates (and optionally the end plate).

In some embodiments, an adhesive is applied to edges of the fin on the side facing the end plate.

A first plate of a heat exchanger according to the invention is placed on the first fin of a heat exchanger (604). The plate is placed with the face of the plate which should be in contact with the fin facing the fin, i.e., faced down (the term "down" is used herein for sake of convenience, with reference to an embodiment where the assembly is performed vertically. However, one should appreciate that other alternatives are available, such as horizontally. The plate is positioned over the fin such that the void (or cutout) of the plate overlaps a portion of the fin. In some embodiments, the cutout of the plate overlaps a portion of the fin comprising at least one through hole for heat exchange tubes. When relevant, the cutout additionally encompasses the tubes which erect from the assembling surface. In some embodiments, the fin is adhered to the plate. In order for the fin to be to adhered to the plate, an adhesive is applied over sections of the peripheral margin around the cutout prior to placing the plate. In some embodiments, the adhesive is applied over the margin of the fin to come in contact with the plate. The adhesive can be applied by common practiced methods known in the art, for example a strip or a plurality of strips of thermally active adhesive may be laid which would later be activated by heating the stack with a heater.

In embodiments in which the plate and/or the fin comprise attaching protrusions and corresponding grooves designed to attach the fin and the plate by snapping, adequate force is applied in order to have the fin snapped in place.

A set comprising a fin of a fins and tubes heat exchanger coupled to a plate of a plates heat exchanger (SFP) is thus obtained.

A new fin is placed over the plate laid in the previous step such that through tube holes of the fins are aligned to enable insertion of heat exchange fluid tubes through the holes at a later stage (606). In some embodiments, the plate comprises attaching protrusions designed to face the next fin and attach the next fin to the next plate. In embodiments where these attaching protrusions comprise a groove for snapping the next fin into place, mild force is applied to the second fin to snap it in said grooves.

A new plate is placed over the fin laid in the previous step (608). In some embodiments, the plate is placed such that it is fully aligned with the first plate. In embodiments in which an alternating arrangement of the plates is responsible for a counter/cross flow (or semi counter-cross) above and below each plate, plates of different embossment are alternately stacked. To this end, a plate having a second type of embossment (for example a mirror image of the embossment of the first plate) is placed over the fin at this stage. Care is given to placing the plate facing at the right direction for enabling the counter/cross (or semi counter-cross) airflow. In embodiments wherein the horizontal positioning of the plate accounts for the counter airflow, care is given to place the plate in the correct orientation.

In some embodiments, instead of alternately inserting plates and fins, the plates are first coupled to fins to obtain SFPs, and the pre-assembled SFPs are inserted through the longitudinal tubes to obtain a stack of SFPs. In such embodiments, the SFPs are inserted in an alternating sequence of SPFs of having plates of different embossment or in an alternated orientation as applicable for producing a counter/cross flow (or semi counter-cross) above and below each plate, Steps 606 to 608 are repeated until a stack of heat exchange SFPs at the desired length is obtained (610). The length of the stack is derived from the corresponding application of the HEFTAP in the apparatus in which it is installed. The skilled artisan would know to define this length accordingly.

In some embodiments, the stacking is performed in a reverse order, beginning first with laying a plate followed by a fin and so forth.

In some embodiments, an end plate covers the top heat exchange plate (611). In some embodiments, the stack is compressed and the compressed state is affixed by connecting the two end plates to at least one fixating connecting rod.

In some embodiments, the end plates are also assembled to the stack, for example to the top and/or bottom fin or plate, by connecting means such as bolts.

Heat exchange fluid tubes are inserted through the tube holes in the fins (612). In embodiments where some heat exchange fluid tubes where inserted as guiding tubes at the preliminary step, then only the remaining tubes are inserted at this stage. In some embodiments, all longitudinally heat exchange tubes are inserted through the first end plate, nullifying this step. In some embodiments the tubes are slightly smaller in diameter than the holes and after their insertion thereto, the tubes are blown to expand and fit tightly in the accommodating holes. In some embodiments, the tube is being blown after the assembly of the HEFTAP in order to increase the heat transfer area between the fin and the tube, and/or in order to keep the stack in place.

In some embodiments, the tubes are connected to each other via connecting fluid tubes. One of the tubes is connected to an inlet tube and one of the tubes is connected to an outlet tube. In some embodiments faces of the HEFTAP obtained are treated to selectively seal gaps between adjacent plates at peripheral locations intended to be blocked for fluid flow as will be explained in detail later.

Figure 7:
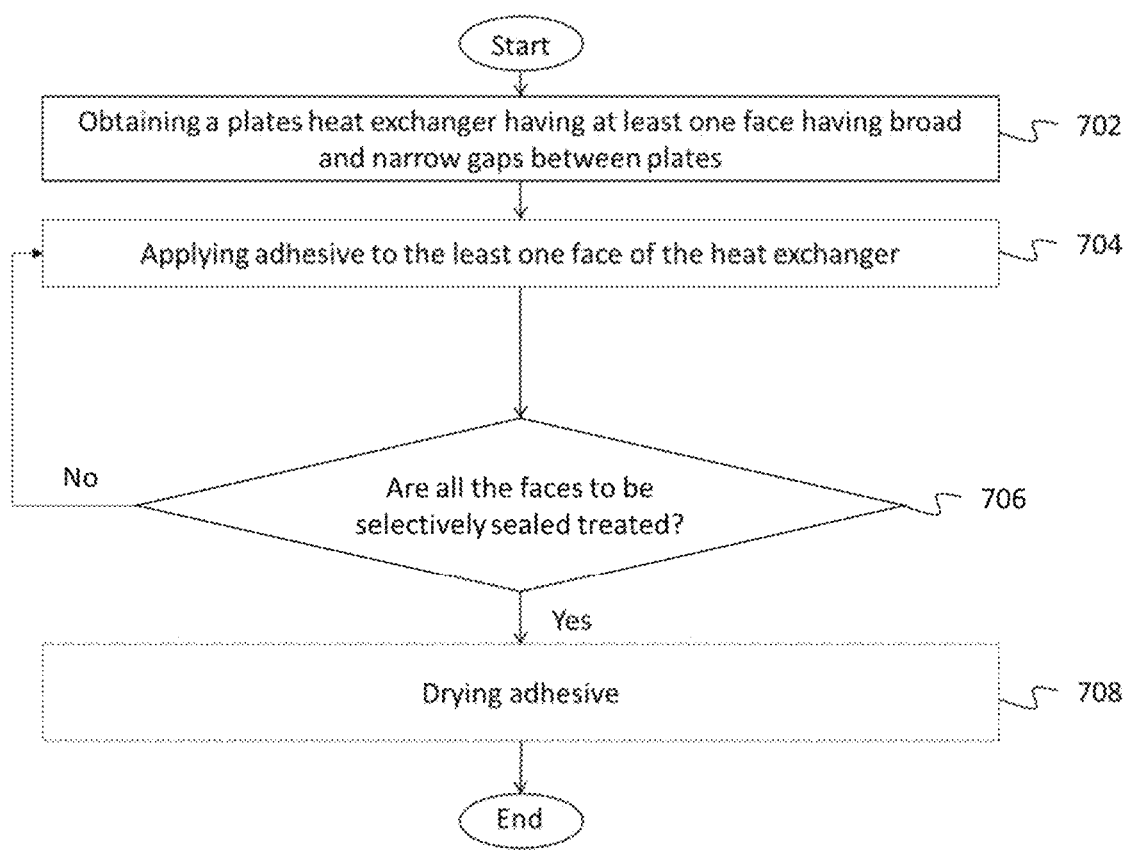
FIG. 7 is a flow chart depicting a method for producing a heat exchanger according to some embodiments of the invention.

Reference is now made to FIG. 7 depicting a flow chart of a method for selectively sealing gaps between adjacent plates of a plates heat exchanger according to yet another aspect of the invention. A plates heat exchanger comprising at least one face comprising broad and narrow gaps is obtained (702). The varied gaps are the outcome of edges of plates comprising lateral peripheral protrusions complying with the aforementioned conditions.

Adhesive is applied to at least one of the faces of the plates heat exchanger comprising the plates edges (704), to obtain a selectively sealed plates heat exchanger (or HEFTAP) at least at one face. The adhesive can be applied by brushing, dipping (into a container containing the adhesive), spraying, injecting, spreading or any other known method in the art. In some embodiments, where the plates are designed to be selectively coalesced by heating or by ultrasonic welding, then heating or ultrasonic welding is performed on the entire face of the plates heat exchanger.

In some embodiments, the method further comprises applying an adhesive to more than one face of the HEFTAP (706).

In some embodiments, the method further includes drying the adhesive (708). In some embodiments, the drying comprises air drying. In some embodiments, the method further comprises drying the adhesive before an adhesive is applied to another face of the HEFTAP.

In some embodiments, the adhesive is selected from at least one of a glue and paint. In some embodiments, the adhesive is applied by at least one of dipping, brushing, injecting and spraying. The application of the adhesive can be performed manually or by automated machinery. In some embodiments, the sealing is applied without adhesive, such as: heating or ultrasonic welding. In some embodiments, the method for selectively sealing is applied on HEFTAPs of the present invention.

In another aspect, the invention provides an apparatus enabling a refrigeration process comprising a compressor, an evaporator, an expansion valve and an evaporator wherein the condenser is the fin and tube heat exchanger encompassed by a plates heat exchanger (HEFTAP) as described above, wherein the evaporator is positioned downstream the HEFTAP wherein airflow which exits the HEFTAP flows through the evaporator. In some embodiments, the HEFTAP comprises gaps allowing air leaks such that, the mass flow rate through the evaporator is higher than the mass flow rate through the condenser. These leaks are at least at one of (i) at least a portion of the connection area between the fins and the plates upstream the fin, and (ii) at least a portion of the contact line between the blockage protrusions and the adjacent plate.

In yet another aspect, the invention provides an apparatus enabling a refrigeration process (a refrigerating apparatus)

comprising a compressor, a condenser, an expansion valve and an evaporator wherein the evaporator is the fin and tube heat exchanger encompassed by a plates heat exchanger as described above, wherein the condenser is positioned downstream the HEFTAP wherein airflow which exits the heat exchanger HEFTAP flows through the condenser. In some embodiments the heat exchanger HEFTAP comprises gaps allowing fluid (e.g., air) leaks such that, the mass flow rate through the condenser is higher than the mass flow rate through the evaporator. These gaps are located at least at one of (i) at least a portion of the connection area between a fin and a plate upstream the fin, and (ii) at least a portion of the contact line between the blockage protrusions and the adjacent plate.

Figure 8:
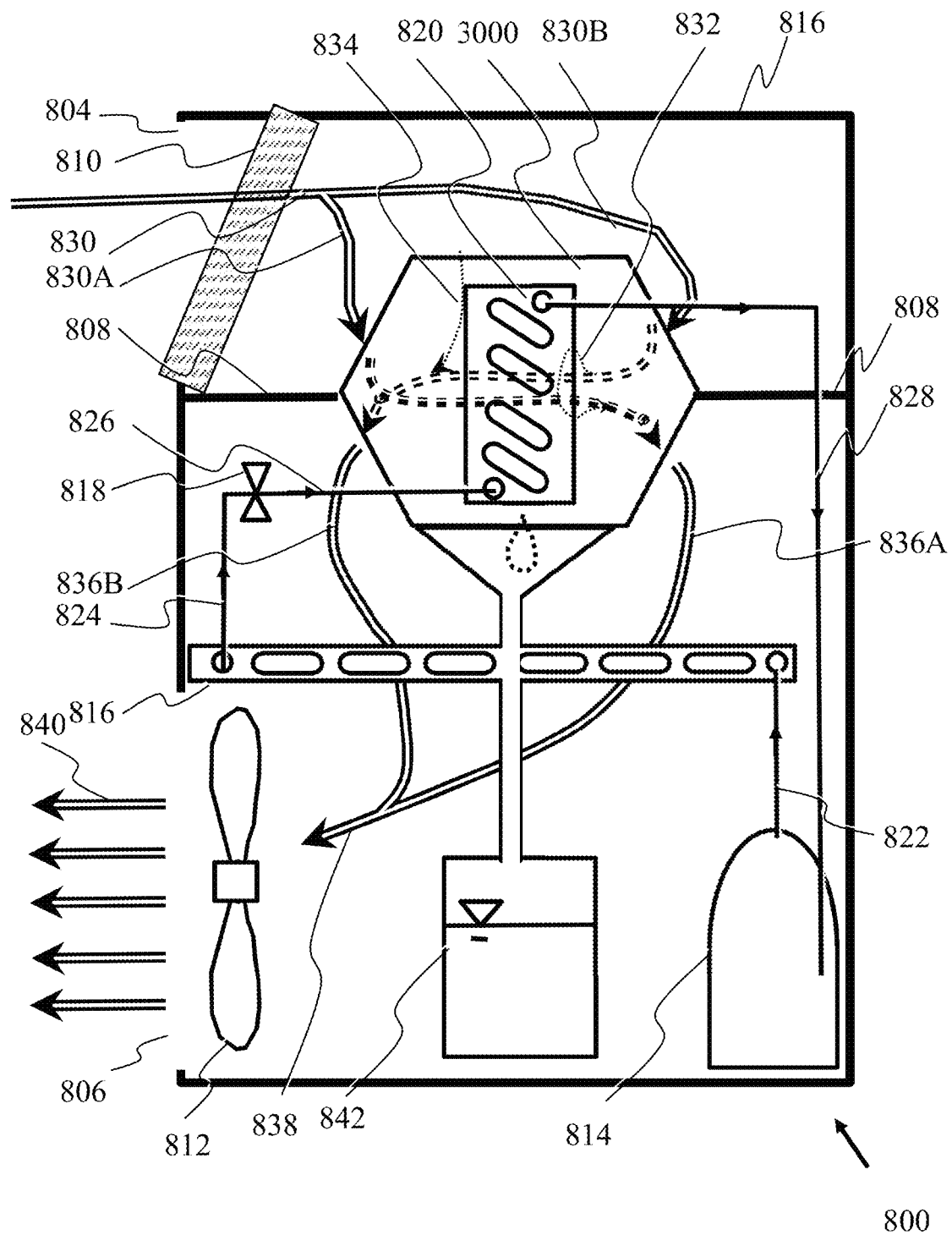
FIG. 8 is a block diagram depicting an apparatus comprising an airflow exiting a heat exchanger having leaks cooling a condenser downstream the heat exchanger according to some embodiments of the invention.

By way of example, reference is now made to FIG. 8 depicting a water extraction apparatus 800 according to an embodiment of the invention. The apparatus 800 comprises a container 802 having an air inlet 804 and air outlet(s) 806, the container 802 accommodates a barrier 808, an air filter (optional) 810, a blower 812, a compressor 814, a condenser 816, expansion valve 818, a HEFTAP 3000 comprising a fin and tubes heat exchanger acting as an evaporator 820, encompassed by a plates heat exchanger, a set of refrigerant tubes 822, 824, 826 and 828. The person of skill in the art would know to make the necessary conventional adjustments and addition of supplementary elements for the system to work properly. The compressor 814 is configured to compress a refrigerant to high temperature dry gas, which may flow through tube 822 toward a condenser 816. Within the condenser, the refrigerant may be cooled down and become a saturated high temperature liquid. The refrigerant liquid may flow through tube 824, through an expansion valve 818, become a lower temperature mixture of fluid and gas, then through tube 826 toward the evaporator 820, wherein the liquid may evaporate then through tube 828 back to the inlet of the compressor 814 to complete a cycle. The condenser 816 emits heat from the refrigerant cycle and the evaporator 820 absorbs heat into the refrigerant cycle.

The blower 812, which is positioned close to the outlet(s) 806 of the container 802, is configured to motivate an air flow 830 from the air inlet 804 through an air filter 810 (optional), then the airflow 830 may split into two sub-flows 830A and 830B to enter into the HEFTAP 3000 through the two sets of inlets where multiple counter airflows exchange heat and are stripped from humidity. The air flows 836A and 836B may exit through the two sets of outlets of the HEFTAP 3000 and combine into airflow 836 which passes through the condenser 816, which is positioned downstream the HEFTAP 3000. The two air flows 836A and 836B that exit from the two sets of outlets of HEFTAP 3000 may cool down the condenser 816. FIG. 8 depicts the two sub-streams (or air flows) 836A and 836B as converging into a single 838 stream downstream of the condenser 816; however, it should be appreciated that the sub-streams 836A and 836B may also converge or begin to converge before flowing through the condenser 816. The flow 838 enters the blower 812 and exists the apparatus as flow 840. The water extracted from the LPGA may be collected into a water reservoir 842. To compensate for leaks of air in the HEFTAP (type I and type II leaks 832 and 834, respectively), the blower 812 pulls extra air flow to meet the required water extraction yield. Thus, due to the existence of leaks, more air mass flow flows through the condenser 816 than flows through the evaporator 820. The high flow rate through the condenser contributes to an increase in the heat exchanging rate of the condenser 816, reduces its average temperature and by that increases the COP of the system 800 but it also increases the blower power consumption. Therefore, a person of skill in the art may find the balance between keeping some of the leakages and sealing at least a part of them, in order to obtain optimal performance of the system. Thus, in some embodiments, part of the leakages is prevented by having at least part of the aforementioned gaps sealed.

In embodiments of HEFTAPs disclosed in this invention which are involved in treatment or extraction of food products or food grade products including drinks and in particular water, the materials which come in contact with the treated fluid or the product are made of food grade materials.

It is also noted that, in some embodiments, in particular such embodiments which elevated temperatures are used, then the components which are heated during the process should be made of materials which can sustain these temperatures. In some embodiments materials which are stable at 50° C., in some embodiments 60° C. and in some embodiments 90° C. are used.

EXAMPLE

Example 1

One of the efficiency parameters of water extraction from air is the figure representing the amount of energy invested for extracting a given amount of water from air with given relative humidity and temperature. For example, Standard ANSI/AHAM DH-01-2008 defines an energy factor (E.F) which represents the amount of water extracted (in liters) divided by electrical power consumed (in KW*Hr) at standard atmospheric conditions of 26.7° C./60% RH. This invention enables to reach an E.F>3.3 using a compressor with C.O.P of 3, extracting more than 23 lit/day, with air flowrate of ~250 m$^3$/Hr at apparatus volume of less than 0.02 m$^3$ without freezing. Using off the shelf blower and compressor, such system noise level can be less than 55 dBA when measured one meter in front of the center of the air outlet.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A heat exchanger comprising:
   a fins and tubes heat exchanger, comprising a stack of fins, the fins comprising at least one through hole coupled with a penetrating heat exchanging tube, and at least a portion of the fins comprising at least one through fluid aperture allowing fluid to pass from a first side of the fin to a second side of the fin;
   a plates heat exchanger comprising a stack of plates, at least two sets of flow inlets and two sets of flow outlets, at least a portion of the plates each comprising a void and an embossment,
   wherein each one of at least a portion of the fins of the fins and tubes heat exchanger being at least partially attached to or encompassed by a corresponding plate of the plates heat exchanger to define a set of a fin and a plate (SFP) such that fluid flowing over either side of the plate comes in contact with the fin;
   wherein at least one of: (i) an alternating order of differently embossed plates; and (ii) an alternating orientation of plates in the stack, is adapted to enable one or more of (i) a simultaneous counter fluid flow, (ii) cross fluid flow or (iii) semi counter-cross fluid flow above and below the SFP; and wherein the at least one through fluid aperture enables a sub-flow from a flow flowing over the fin to flow through the through hole and merge with a sub-flow flow flowing behind the fin in another direction.

2. The heat exchanger according to claim 1 wherein a first portion of the plates each comprising the embossment configured to channel a first fluid flow between adjacent plates from a first inlet zone toward a first heat exchanging zone, then from between adjacent plates toward a second heat exchanging zone, then from between adjacent fins toward a third heat exchanging zone and then to over a first fluid outlet zone;

a second portion of the plates each comprising the embossment configured to simultaneously channel a second fluid flow between adjacent plates from over a second inlet zone toward a third heat exchanging zone, then from between adjacent plates toward a second heat exchanging zone, then from between adjacent fins toward a first heat exchanging zone and then to over a second fluid outlet zone.

3. The heat exchanger according to claim 1 wherein a fluid flowing from the fluid inlet zone toward the second heat exchanging zone exchanges heat in the first heat exchanging zone with a counter fluid flow, cross fluid flow or semi-cross counter fluid flow fluid flowing simultaneously on the other side of the plate through the plate surface, then the fluid flow exchanges heat with the exposed fins in the second heat exchanging zone, then exchanges heat with a counter fluid flow, cross fluid flow or semi-cross counter fluid flow on the other side of the plate through the plate in the third heat exchanging zone and exits through the fluid outlet zone.

4. The heat exchanger according to claim 1 wherein at least one of the plate and the fin of the SFP comprises attaching protrusions disposed in proximity to the void and adapted to press and attach a fin to a peripheral margin of the adjacent plate around a void.

5. The heat exchanger according to claim 1 wherein the voids of the plates are cutouts defined by internal edges of the plates and in case the fins are attached to the plate the cutout is characterized by having an area smaller than the area of the fin.

6. The heat exchanger according to claim 1 wherein at least a portion of the fins further comprising at least one through fluid aperture allowing fluid to pass from one side of the fin to the other side.

7. The heat exchanger according to claim 6 wherein the at least one through fluid aperture is bypassed by a protrusion.

8. The heat exchanger according to claim 6 wherein the at least one fluid aperture is located in an area wherein the differential static pressure between two sides of the fin had the fin lacked the apertures and had an air flow flowing from first inlet to first outlet and had a second airflow flowing from second inlet to second outlet, is less than 30% of the pressure drop between the inlet and the outlet.

9. The heat exchanger according to claim 1 wherein said plates comprising lateral peripheral protrusions designed to form, when the plate is stacked with another plate, one of:

(a) at least one of:
 i. a gap between the peripheral protrusions and a surface of an adjacent plate facing the peripheral protrusion, being sufficiently narrow to enable applied adhesive to fill the gap; and
 ii. an outer lateral width of the two plates, enabling an applied adhesive to encircle the outer edges of the plates;

at peripheral locations intended to be sealed, wherein the plate is designed to form a gap, when the plate is stacked with another plate, between the edge of the plate and the edge of the adjacent plate facing the first plate at locations where the gap should remain open, being larger than a gap allowing an applied adhesive to fill or encircle the gap such that the gap remains open; and (b) a gap between the peripheral protrusions and a surface of an adjacent plate facing the peripheral protrusion, being sufficiently narrow to enable the edges of the plates to melt and coalesce upon applying heat at peripheral locations intended to be sealed, wherein the plate is designed to form a gap, when the plate is stacked with another plate, between the edge of the plate and the edge of the adjacent plate facing the first plate at locations where the gap should remain open, being larger than a gap allowing the edges of the plates to melt and coalesce upon applying heat such that the gap remains open.

10. The heat exchanger according to claim 9 wherein the maximal gap at locations intended to be blocked for fluid flow is smaller than the diameter of a drop of the adhesive being formed when dropped on a surface of the plates.

11. The heat exchange according to claim 9 wherein the minimal gap at locations intended to be open for fluid flow is larger than the diameter of a drop of the adhesive being formed when dropped on a surface made of the same material of surface of the plate.

12. The heat exchanger according to claim 1 wherein the plate further comprising a fluid inlet zone, a first heat exchanging zone, a second heat exchanging zone, a third heat exchanging zone and a fluid outlet zone, at least one of the inlet zone and the outlet zone comprising uniformizing protrusions configured to reduce the amount of non-uniform fluid mass flow between different fluid flow channel protrusions of first heat exchanging zone then through the second heat exchanging zone, then through the third heat exchanging zone and then through the fluid outlet zone.

13. The heat exchanger according to claim 12 wherein the embossment of the uniformizing protrusions in at least one of the fluid inlet and outlet zone comprises at least one of a bent line protrusion, a dot protrusion, unevenly spaced protrusion lines, non-parallel protrusion lines, non-aligned starting points and non-aligned end points.

14. The heat exchanger according to claim 12 wherein embossment of fluid flow channels in at least one of the first and third heat exchanging zones comprises at least one bent line protrusion in proximity to the inlet or outlet zone respectively.

15. The heat exchanger according to claim 1 wherein the plates are made of a material having a thermal conductivity of less than $$5 \frac{W}{m \cdot {}^\circ C.}$$

and the fins are made of a material having a thermal conductivity higher than $$50 \frac{W}{m \cdot {}^\circ C.}.$$

* * * * *